US012809661B2

(12) United States Patent
Dankwa

(10) Patent No.: US 12,809,661 B2
(45) Date of Patent: Nov. 24, 2026

(54) ANOMALY DETECTION SYSTEM FOR HARD REAL-TIME EMBEDDED SYSTEMS

(71) Applicant: Rolls-Royce North American Technologies Inc., Indianapolis, IN (US)

(72) Inventor: Boakye Dankwa, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 41 days.

(21) Appl. No.: 19/074,550

(22) Filed: Mar. 10, 2025

(65) Prior Publication Data

US 2026/0267680 A1 Sep. 10, 2026

(51) Int. Cl.

*G06F 9/48* (2006.01)
*G06F 9/30* (2018.01)
*G06F 9/448* (2018.01)

(52) U.S. Cl.

CPC ........ *G06F 9/4812* (2013.01); *G06F 9/30058* (2013.01); *G06F 9/30116* (2013.01); *G06F 9/4498* (2018.02)

(58) Field of Classification Search

None

See application file for complete search history.

(56) References Cited

U.S. PATENT DOCUMENTS

2022/0292183 A1* 9/2022 Solomatnikov ..... G06F 9/30116

OTHER PUBLICATIONS

Abbasi, A., et al., "ECFI: Asynchronous Control Flow Integrity for Programmable Logic Controllers," ACSAC '17: Proceedings of the 33rd Annual Computer Security Applications Conference, Dec. 2017, pp. 437-448, Retrieved from: https://doi.org/10.1145/3134600.3134618.

Bellec, N., et al., "Attack detection through monitoring of timing deviations in embedded real-time systems," HAL Open Science, ECRTS 2020—32nd Euromicro Conference on Real-Time Systems, Jul. 2020, pp. 1-22, Retrieved from https://inria.hal.science/hal-02559549v1.

Dankwa, B., "Anomaly Detection in Hard Real-Time Embedded Systems", Abstract of Purdue University Graduate School thesis, Purdue University, dated Sep. 30, 2024 [Retrieved Feb. 3, 2025], pp. 1-3, Retrieved from https://doi.org/10.25394/PGS.27123324.v1.

(Continued)

*Primary Examiner* — Scott C Sun

(74) *Attorney, Agent, or Firm* — Hussey IP, LLC

(57) ABSTRACT

Anomaly detection system, runtime anomaly detectors, and methods of generating a security automaton for the runtime anomaly detector are provided. The security automaton may be configured to implement an extended finite state machine comprising states and transitions, the transitions representing valid transitions between the states. The states may correspond to code blocks in a control-flow graph for the target program, and the transitions may correspond to edges in the control-flow graph. Each of the transitions has one or more security policies based on a label assigned to a corresponding one of the edges, the label indicating a branch type of the corresponding one of the edges. The controller may be configured to enforce the one or more security policies of a respective one of the transitions that corresponds to a current transition from a previous state to a next state, the next state corresponding to the branch target.

20 Claims, 23 Drawing Sheets

(56) References Cited

OTHER PUBLICATIONS

Du, Y., et al., "Holistic Control-Flow Protection on Real-Time Embedded Systems with Kage," USENIX Security Symposium, Boston, MA, USA, Aug. 2022, pp. 2280-2298, Retrieved from https://www.usenix.org/conference/usenixsecurity22/presentation/du.

Feng, L., et al., "FastCFI: Real-time Control-Flow Integrity Using FPGA without Code Instrumentation," ACM Transactions on Design Automation of Electronic Systems (TODAES), vol. 26, Issue 5, Article No. 39, May 2021, pp. 1-39. Retrieved from https://dl.acm.org/doi/10.1145/3458471.

Kawada, T., et al., "TZmCFI: RTOS-Aware Control-Flow Integrity Using TrustZone for Armv8-M," International Journal of Parallel Programming, vol. 49, Springer, Jul. 2021, pp. 216-236.

Lu, S., et al., "Time and Sequence Integrated Runtime Anomaly Detection for Embedded Systems," ACM Trans. Embed. Comput. Syst. 17, 2, Article 38, Dec. 2017, pp. 1-27, Retrieved from: https://doi.org/10.1145/3122785.

Tauner, S., "RIPEMB: A framework for assessing hardware-assisted software security schemes in embedded systems," 17th International Conference on Availability, Reliability and Security (ARES 2022), Vienna, Austria, Aug. 2022, pp. 1-6, Retrieved from: https://doi.org/10.1145/3538969.3539013.

Walls, R., et al., "Control-Flow Integrity for Real-Time Embedded Systems," In 31st Euromicro Conference on Real-Time Systems (ECRTS 2019), Leibniz International Proceedings in Informatics (LIPIcs), vol. 133, 2019, pp. 1-24, Retrieved from https://doi.org/10.4230/LIPIcs.ECRTS.2019.2.

European Search Report, European Patent Application No. 26157276.2, Munich, Germany, European Patent Office, Jul. 22, 2026, pp. 1-6.

Lavan, Yannick, et al., "DExIE—An IoT-Class Hardware Monitor for Real-Time Fine-Grained Control-Flow Integrity", 2021 The 4th International Conference on Computers in Management and Business ACMPUB27, New York, NY, Jan. 18, 2021, pp. 26-34.

Zhang, Yumei, et al., "ReCFA: Resilient Control-Flow Attestation", ARXIV.ORG, Cornell University Library, 201 Olin Library, Cornell University, Ithaca, NY, Oct. 22, 2021, pp. 1-12.

* cited by examiner

CFG Generation Algorithm 202

Input: *ASM*:- Assembly code, *F*:- Function list, *U*:- User-defined edges
Output: $G(B, E)$: Control-Flow Graph Partition all functions $F \in ASM$ into a set of code blocks $B$
foreach code block $b_i \in B$
  Create a directed edge e = $(b_i, b_j)$ between $b_i$ and each target block $b_j$ of all branch targets
  $E \leftarrow E \cup e$
  Set attributes of each edge e as follow:
    Set *label* of e to one of the following depending on the branch instruction
      (UNCOND_DIRECT, COND_DIRECT, FUNC_CALL, FUNC_RETURN)
    Set *expected branch target* to $b_j$
    if $b_j$ is a function return location
      Set *context* of edge e to memory location of function call
    endif
    if $b_i$ is an ISR entry
      Label $b_i$ as ISR_ENTRY
    endif
    if $b_i$ is last code block of ISR
      Label $b_i$ as ISR_RETURN
    endif
    if $b_i$ is an entry of a context switch routine
      Label $b_i$ as CTX_ENTRY
    endif
    if $b_i$ is last code block of context switch routine
      Label $b_i$ as CTX_RETURN
    endif
endfor
$E \leftarrow E \cup U$
if code blocks with indirect branch targets remain
  create an edge between each code block and a virtual code block, and
  label each edge UNKNOWN
endif
return $G$

FIG. 2

Security Automaton Generation Algorithm 402

Input: $G(B, E)$: Control-Flow Graph Output: $SA(S, s_0 T)$:
SecurityAutomaton
$S \leftarrow B$
$s_0 \leftarrow$ initial state
foreach state pair $(s_i, s_j) \in S$
  if $(s_i, s_j) \in E$
    Set security policy $T_{si,sj}$ based on the edge label:
      (UNCOND_DIRECT, COND_DIRECT, UNCOND_INDIRECT
      COND_INDIRECT):
        guard_functions: Verify expected branch target
      FUNC_CALL:
        guard_functions: Verify expected branch target
        update_functions: Push call location onto shadow stack
      FUNC_RETURN:
        guard_functions: Verify expected branch target, Verify call location
        update_functions: Pop call location from shadow stack
      ISR_ENTRY:
        guard_functions: Verify expected branch target
        update_functions: Push ISR return location onto exception stack
      ISR_RETURN:
        guard_functions: Verify expected branch target, verify ISR return location
        update_functions: Pop return ISR return location from exception stack
      CTX_ENTRY:
        guard_functions: Verify expected branch target
        update_functions: Push CTX return location of current task onto exception stack
      CTX_RETURN:
        guard_functions: Verify expected branch target, verify CTX return location
        update_functions: Pop return CTX return location from exception stack
    Apply any user-defined policies
  endif
endfor
return $SA$

FIG. 4

504 504 506 508 510 512 514 502

| Current State | Next State | Transition Label | Security Policy | | |
|---|---|---|---|---|---|
| | | | Guard Functions | Update Functions | Context Data |
| $S_a$ | $S_b$ | REGULAR | b == branch_target | - | - |
| $S_k$ | $S_j$ | FUNC_CALL | j == branch_target | push($cl_{runtime}$), start_time() | - |
| $S_j$ | $S_d$ | FUNC_RETURN | b == branch_target<br>$cl_{runtime} == cl_{static}$<br>$\lvert t_{runtime} - t_{static} \rvert \leq \epsilon$ | $cl_{runtime}$=pop()<br>$t_{runtime}$=stop_timer() | $cl_{static}$<br>$t_{static}$ |
| $S_*$ | $S_{isr}$ | ISR_ENTRY | isr == branch_target | push($rl_{runtime}$) | - |
| $S_{isr}$ | $S_*$ | ISR_RETURN | $branch\_target == rl_{runtime}$ | $rl_{runtime}$=pop() | - |
| $S_*$ | $S_{ctx}$ | CTX_ENTRY | ctx == branch_target | [taskID, push($rl_{runtime}$)] | - |
| $S_{ctx}$ | $S_*$ | CTX_RETURN | $branch\_target == rl_{runtime}$ | $rl_{runtime}$=[taskID, pop()] | - |

FIG. 5 b1

108 b2

```
10058c  mov r3, r0
100590  str r3, [fp, #-48]
100594  ldr r3, [fp, #-48]
100598  cmp r3, #0
10059c  bne 1004b8 <perform_attack+0x68>
1005a0  movw r0, #23800
1005a4  movt r0, #17
1005a8  bl 1036ac <restore_heap>
```

100

FIG. 8

```
Input: G: Control-Flow Graph
Output: G': Compressed Control-Flow Graph
Find all Conditional Root Nodes in G
foreach Conditional Root Node ∈ G
   Label "Conditional-False" child node DELETE_CANDIDATE.
   Label "Conditional-False" edge DELETE_CANDIDATE.
   Create outgoing edge between Conditional Node and all grandchildren
     nodes, except "Conditional-False" grandchildren.
endfor
Remove all edges labeled DELETE_CANDIDATE.
Remove all nodes labeled DELETE_CANDIDATE, except those with incoming edges.
return G
```

FIG. 10

504 504 506 510 508 512 514

| Current State | Next State | Transition Label | Security Policy | | |
|---|---|---|---|---|---|
| | | | Guard Functions | Update Functions | Context Data |
| $s_B$ | $s_E$ | FUNC_CALL | $E$ == branch_target | push(ss,$B'$)<br>push(fs,$B$) | - |
| $s_E$ | $s_{cb_B}$ | FUNC_CALL | ($cb_B$ == branch_target) &&<br>($B_{runtime}$ == $B$) | push(ss,$E'$)<br>$B_{runtime}$ = pop(fs) | $B$ |
| $s_{cb_B}$ | $s_E$ | FUNC_RETURN | ($E$ == branch_target) &&<br>($E'_{runtime}$ == $E'$) | $E'_{runtime}$ = pop(ss) | $E'$ |
| $s_D$ | $s_E$ | FUNC_CALL | $E$ == branch_target | push(ss,$D'$) | |
| $s_E$ | $s_{cb_D}$ | FUNC_CALL | ($cb_D$ == branch_target) &&<br>($D_{runtime}$ == $D$) | push($E'$)<br>$D$ = pop(fs) | $D$ |
| $s_{cb_D}$ | $s_E$ | FUNC_RETURN | ($E$ == branch_target) &&<br>($E'_{runtime}$ == $E'$) | $E'_{runtime}$ = pop(ss) | $E'$ |
| $s_E$ | $s_B$ | FUNC_RETURN | ($B''$ == branch_target) &&<br>($B'_{runtime}$==$B'$) | $B'_{runtime}$=pop(ss) | $B'$ |
| $s_E$ | $s_D$ | FUNC_RETURN | ($D''$ == branch_target) &&<br>($D'_{runtime}$==$D'$) | $D'_{runtime}$=pop(ss) | $D'$ |

502

FIG. 11

508

| Current State | Next State | Transition Label | Security Policy | | |
|---|---|---|---|---|---|
| | | | Guard Functions | Update Functions | Data |
| $S_*$ | $S_{isr}$ | ISR_ENTRY | isr == branch_target | push(es, $s_*, s_{n_1}, \ldots, s_{n_n}$) | - |
| $S'_{isr}$ | $S_*$ | ISR_RETURN | branch_target $\in \{s_*, s_{n_1}, \ldots, s_{n_n}\}$ | $s_*, s_{n_1}, \ldots, s_{n_n} = Pop(es)$ | - |

502

FIG. 17

508

| Current State | Next State | Transition Label | Security Policy | | |
|---|---|---|---|---|---|
| | | | Guard Functions | Update Functions | Data |
| $S_*$ | $S_{dx}$ | CTX_ENTRY | ctx == branch_target | [taskID, push(es, $s_*, s_{n_1}, \ldots, s_{n_m}$)] | - |
| $S_{dx}$ | $S_*$ | CTX_RETURN | branch_target ∈ $\{s_*, s_{n_1}, \ldots, s_{n_m}\}$ | $s_*, s_{n_1}, \ldots, s_{n_m}$ =[taskID, pop(es)] | - |

502

FIG. 19

ANOMALY DETECTION SYSTEM FOR HARD REAL-TIME EMBEDDED SYSTEMS

CROSS REFERENCE TO RELATED APPLICATIONS

Technical Field

This disclosure relates to anomaly detection systems and, in particular, to anomaly detection systems for embedded systems.

BACKGROUND

Present anomaly detection systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the FIGURES are not necessarily to scale.

Moreover, in the FIGURES, like-referenced numerals designate corresponding parts throughout the different views.

FIG. 2 illustrates an example of a CFG generation algorithm;

FIG. 4 shows an example of a security automaton generation algorithm;

FIG. 5 illustrates an example of the output of the security automaton generation algorithm;

FIG. 8 illustrates example of code snippets to help illustrate a pruning optimization technique;

FIG. 10 illustrates a pruning algorithm for optimizing the security automaton;

FIG. 11 illustrates examples of security policies to enforce backward and forward context sensitivity for an example set of transitions;

FIG. 17 shows the security policies for the transitions to and from an ISR;

FIG. 19 illustrates an example of the security policies to model the target program's behavior during the transitions of a context switch;

DETAILED DESCRIPTION

Figure 1:
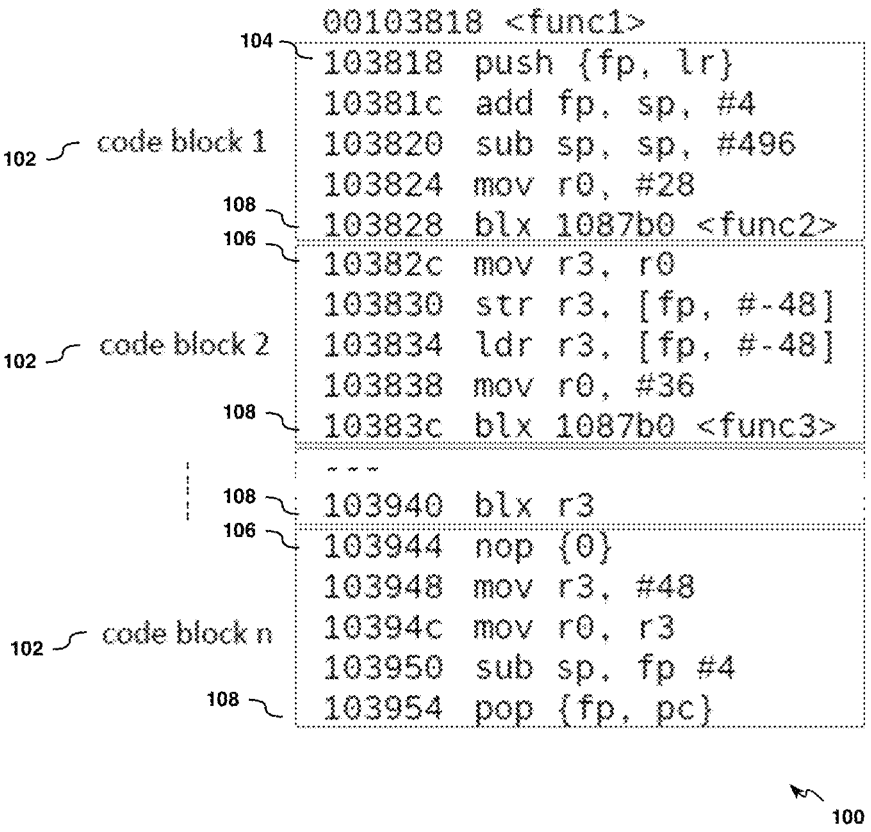
FIG. 1 illustrates an example of a code snippet of the target program showing how code blocks are constructed.

In one example, a runtime anomaly detector is provided that includes a controller and a security automaton. The controller may be configured to receive a branch target, wherein the branch target corresponds a memory location pointed to by a program counter of a processor in response to an interrupt, a context switch, or an execution of a branch instruction during execution of a target program by the processor. The runtime anomaly detector may be configured to receive the branch target from execution trace hardware or from a system bus of the processor. The security automaton may be configured to implement an extended finite state machine (EFSM), the EFSM comprising states and transitions, the transitions representing valid transitions between the states. The states may correspond to code blocks in a control-flow graph for the target program, and the transitions may correspond to edges in the control-flow graph. Each of the code blocks in the control-flow graph may represent a respective sequence of assembly code instructions in the target program that begins on a function entry or a next sequential instruction after a prior branch instruction and ends on a closing branch instruction. For each respective one of the code blocks, one or more of the edges is from the respective one of the code blocks to each target code block of all branch targets of the respective one of code blocks. Each of the transitions has one or more security policies based on a label assigned to a corresponding one of the edges, the label indicating a branch type of the corresponding one of the edges. The controller may be configured to enforce the one or more security policies of a respective one of the transitions that corresponds to a current transition from a previous state to a next state, the next state corresponding to the branch target. The controller may be further configured to raise an alarm in response to the current transition being invalid according to the one or more security policies of the respective one of the transitions. For example, the controller may be configured to send an alarm signal.

In a Control-Flow Hijacking (CFH) attack, attackers change valid control-flow in programs by using techniques such as Return Oriented Programming (ROP) and Jump Oriented Programming (JOP). Precision and performance overhead are significant challenges in Control-Flow Integrity (CFI) techniques. Despite improved Control-Flow Graph (CFG) precision in fine-grained approaches, CFG generation tools cannot perfectly capture program properties such as context sensitivity. Consequently, fine-grained techniques have been defeated. Advanced forward-edge context-sensitive CFI techniques proposed further below track paths in the CFG and may defeat such attacks. CFI techniques typically rely on code instrumentation to enforce valid control-flow transfers. The extra code introduces overhead and may introduce unknown side effects. These challenges make existing CFI techniques generally inapplicable to hard real-time embedded systems because hard real-time programs must meet strict temporal constraints. Hard real-time programs are programs that have strict timing requirements and must meet timing deadlines to ensure the system functions properly. Moreover, code instrumentation is typically not allowed in certain aerospace-related industries.

An anomaly detection system is described herein and may be alternatively referred to as HASGuard (a Hardware-ASsisted framework that Guards against anomalous behaviors). The anomaly detection system provides a context-sensitive control-flow monitoring anomaly detection mechanism for hard real-time embedded systems. The anomaly detection system does not require code instrumentation, may preserve temporal properties, and may improve security performance by monitoring more program behaviors than other solutions. The anomaly detection system uses a security automaton to model multiple program behaviors including, for example, real-time properties. The anomaly detection system may model control-flow transfers to achieve fine-grained control-flow monitoring, on top of which other program behaviors (such as temporal, memory access patterns, and others) may be modeled as additional security policies to increase the scope of detectable anomalies. The anomaly detection system may enable existing hardware mechanisms in modern microcontrollers to be leveraged to capture minimal execution trace information without the need to instrument target programs, thereby preserving the real-time properties of the target program. Accordingly, the anomaly detection systems, methods, and runtime anomaly detectors described herein provide a technical solution to a technical problem.

Prior anomaly detection methods that track control-flow transfers in real-time programs may have certain limitations. For example, code instrumentation, where researchers insert code into programs to assist detection, is a significant limitation. Intrusive methods that modify a real-time operating system (RTOS) or program to enforce CFI or export trace data may introduce unknown functionality, incur impractical overheads, and are difficult to add to safety-certified airborne software. Some techniques may only apply to single-threaded programs, while others track single-program behavior such as control-flow alone. However, real-time programs usually include multiple threads. The anomaly detection system enables monitoring more than one behavior and may improve detection efficiency as a result. For example, temporal characteristics may be monitored in combination to control-flow.

Methods that require compiler modifications may face resistance in industries where development tools require qualification—a process that ensures the tool meets specific safety and reliability requirements. For instance, the need to qualify a compiler makes such methods expensive in the aerospace industry. A flexible anomaly detection scheme that requires no code modification and allows monitoring of multiple program behaviors is needed. In some examples, the anomaly detection system includes a hardware-assisted anomaly detection framework that preserves the temporal requirements of hard real-time programs. The anomaly detection system uses a target program's control-flow transfer behavior to construct a baseline model of the target program's execution upon which other properties, such as temporal and memory access patterns may be modeled. The anomaly detection system may rely on existing execution trace hardware or access to a system bus to export runtime information for verification on an adjacent processing system. The mechanism may be deployed in hardware on an ASIC or an FPGA. Design goals for the framework may include one or more of the following: (1) a configurable scheme that enables various execution behavior models; (2) an approach that avoids code instrumentation or expensive CPU redesign; and (3) an approach that is practical and consistent with industry development processes.

Concepts

One method for monitoring programs for anomalies is to execute an exact copy of a program on an adjacent processor and compare the results of each executed instruction with the monitored program. The approach may seem naive; however, similar schemes have been deployed in redundant systems in the safety-critical industry. Boeing's triple-triple redundant 777 flight computer is a classic example. In Boeing's implementation, three identical flight computers execute the exact copy of flight control software. The outputs of three computers are compared and voted on. Only the output of the winning vote is used for flight control. While the redundancy approach works for the safety case (it is highly unlikely that all redundant systems will fail simultaneously), it will not be effective in the security case. The reason is that all identical redundant hardware and software will have identical vulnerabilities and consume similar inputs. Therefore, any successful attack on any of them will also be successful on the rest, especially if there is no diversity in the software or hardware. Even if the program instructions are compared, such micro solutions may be slow, require processor modification, and may be limited to small programs, making them impractical for real-world application. A scheme that models program behaviors with a higher abstraction, such as this thesis, may overcome these limitations.

Anomaly detection studies that monitor non-deterministic macro program behavior, such as side channels, performance counters, and those that employ heuristic methods suffer from high false-positive rates. It is challenging to model system behavior precisely using these methods; therefore, approximate program behavior is used as the basis for monitoring and detection decisions. A flexible control-flow monitoring scheme that precisely monitors multiple program behaviors may effectively detect anomalies in embedded programs. It is desired to support CFI techniques, such as shadow stack and fine-grained monitoring, as well as challenging unpredictable properties, such as interrupts, in real-time programs. Macro-level program behaviors, such as system traces for security analysis, may be modeled using an Extended Finite State Machine (EFSM) that not only ensures stateful transitions but is also able to merge those transitions with internal state data. In addition to modeling macro-level program behaviors, the anomaly detection system may model micro-level program behaviors such as control-flow transfers and temporal behavior. The anomaly detection system models program behavior using an EFSM that constructs the baseline behavior model using control-flow transfers. As explained further below, this model establishes the foundation that enables other program behaviors, such as temporal characteristics, to be specified.

Control-flow-based anomaly detection techniques that instrument the target program may incur significant overhead. CPU cycles taken to execute the instrumentation code are cycles that the original program code could otherwise use. Additionally, the instrumented code may inadvertently change internal register values. This side effect may result in a behavior different from the non-instrumented code, which is unacceptable in certain practical applications. Some existing solutions may require expensive processor modification to augment the processor with anomaly detection modules. An approach that requires no processor or code modification overcomes these limitations. The anomaly detection system may leverage existing execution trace hardware features sometimes available in Commercial-Off-The-Shelf (COTS) embedded computing platforms to achieve our second goal. Alternatively, an ASIC may implement and integrate vendor specifications without modifying the host processor. Runtime information used for control-flow transfer verification may be obtained using the hardware resources, freeing the processor of unacceptable overhead and unknown functionality caused by code instrumentation.

As noted above, one of our goals may be for the implementation workflow to integrate seamlessly into the typical industry system development process. Therefore, our scheme may allow for implementation on an ASIC or existing COTS hardware and be easy for the development team to implement, test, and deploy with minimal knowledge of the scheme's internals. Therefore, automation in generating program behavior models may address this goal.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Runtime Security Automation

A fundamental challenge of modeling program behavior using the program's CFG is the precision of the graph. It is difficult to determine all indirect edges of practical programs without extensive full coverage static and dynamic analysis, which may not even be feasible for certain large general-purpose programs. However, we discovered that programs running on embedded systems such as FADECs, ECUs, and PLCs typically solve specific problems and may be relatively simple and deterministic—most, if not all, indirect branches may be resolved. Therefore, obtaining a relatively precise CFG using static and dynamic analysis may be possible in such scenarios. From this discovery, the anomaly detection system may assume that a good approximation of the program's CFG may be extracted with a static analysis. The CFG and security policies for detecting anomalies may then be used to construct the EFSM to achieve our first goal.

We first construct the CFG by statically scanning the assembly file of the target program. The CFG nodes represent the program's code blocks. FIG. 1 illustrates an example of a code snippet 100 of the target program showing how code blocks 102 are constructed. We define a code block 102 of a program as a sequence of instructions that begins at a function entry 104 or the next sequential instruction 106 after a branch instruction 108 and ends on a branch instruction 108 as shown in FIG. 1. The code snippet 100 of an example of the target program shown in FIG. 1 includes ARMv7-R assembly code for a function (func1) having the function entry 104 located at memory location 0x00103818 with branch instructions 108 at 0x00103828, 0x0010383c, 0x00103940, and 0x00103954. Note that the 0x prefix and the leading 00 are omitted from memory addresses for clarity where necessary in the remainder of the document. The function's first instruction marks the beginning of its first code block 102. Each branch instruction 108 in the function marks the end of the corresponding code block 102. The next sequential instruction 106 marks the start of the following code block 102. Each code block 102 (hence, each CFG node) is identified by the memory address of its first instruction. The rectangles illustrate the code blocks 102 of func1. When the processor executes the branch instruction 108, the program counter (PC) changes (jumps) to the branch target and executes instructions sequentially from that memory location. The branch target is the memory address corresponding to the first instruction the processor executes after executing the branch instruction 108. Each branch target represents an edge in the CFG. Each edge may be categorized, therefore, using labels such as those listed in Table 1 below. The categorization enables the identification and construction of appropriate security policies during static analysis.

TABLE 1

| Label | Description |
|---|---|
| UNCOND_DIRECT | Unconditional direct branch |
| COND_DIRECT | Conditional direct branch |
| UNCOND_INDIRECT | Unconditional indirect branch |
| COND_INDIRECT | Conditional indirect branch |
| FUNC_CALL | Direct and indirect branches that are function calls |
| FUNC_RETURN | Function return |
| ISR_ENTRY | Interrupt entry |
| ISR_RETURN | Interrupt return |
| CTX_ENTRY | Context switch entry |
| CTX_RETURN | Context switch return |

Table 1 provides an example list of labels for branch categories and their corresponding descriptions. The first six labels (UNCOND_DIRECT, COND_DIRECT, UNCOND_INDIRECT, COND_INDIRECT, FUNC_CALL, AND FUNC_RETURN) correspond to branch instruction types of the branch instruction 108 at the end of the code block 102 from which the edge starts. As explained further below, the last four labels (ISR_ENTRY, ISR_RETURN, CTX_ENTRY, AND CTX_RETURN) are for branch categories related to interrupts and context switches.

Table 2 below provides examples of branch instructions 108 corresponding to the branch types on ARM, MIPS, PowerPC, and RISC-V. Note that no instruction is dedicated to conditional indirect branches in MIPS, PowerPC, and RISC-V. Conditional indirect branches are typically achieved through conditional and indirect jumps on those architectures. However, conditional indirect branches may be identified statically for such instruction set architectures (ISAs), similarly to how other branch types are identified. The symbol "-" in Table 2 indicates multiple instructions may be needed to accomplish a branch, and hence, to identify the branch type. Unconditional direct branch instructions are those branch instructions 108 whose operands are constants representing fixed memory locations known at compile time. For example, in row 2 of Table 2, the terms label and target represent fixed memory locations the processor jumps to. A conditional direct branch instruction is similar to an unconditional direct branch instruction, except the jump is conditional. For example, in row 3, column 2, when the processor executes BNE label, the processor jumps to the fixed memory location represented by label if a conditional instruction executed immediately before the branch instruction 108 results in a nonzero conditional flag. Alternatively, if the conditional instruction does not result in a nonzero conditional flag, then the processor continues executing the next sequential instruction. The INDIRECT branch labels in rows 4 and 5 are like their DIRECT counterparts, except the operands are register values unknown at compile time. Thus, the jump locations are computed at runtime. FUNC_RETURN, however, represents edges corresponding to function returns. In this case, the operand is also a register whose value is computed at runtime. However, the return locations for direct function calls may be determined statically. FUNC_CALL labels represent a special subset of DIRECT and INDIRECT edges corresponding to function call instructions. In the examples shown in Table 2, there are no special instructions for function calls. Instead, the instructions in rows 2-5 of Table 2 may possibly represent function calls. The function calls may be identified by inspecting the code around each instruction, which is identified in rows 2-5 of Table 2, to determine if the instruction represents a function call.

TABLE 2

| Label | ARM | MIPS | PowerPC | RISC-V |
|---|---|---|---|---|
| UNCOND_DIRECT | B label | J target | BA target | JAL target |
| COND_DIRECT | BNE label | BEQ RS, RT, offset | BEQ RA, RB target | BEQ RS1, RS2, offset |
| UNCOND_INDIRECT | BX Rm | JR Rs | BCTRL | JALR X1, X10, 0 |
| COND_INDIRECT | BXNE Rm | — | — | — |
| FUNC_RETURN | BX lr | JR Ra | BLR | JALR |

Referring again to Table 1, Interrupt subroutines (ISRs) and context switch routines (CTX) are function calls but the memory locations at which the function calls are made or returned to are not known during a static analysis of the target program. Therefore, edges involving ISRs and CTXs are appropriately labelled ISR_ENTRY, ISR_RETURN, CTX_ENTRY, or CTX_RETURN in the static analysis to enable a runtime verification described further below.

FIG. 2 illustrates an example of a CFG generation algorithm 202 in the form of pseudocode. The Control-Flow Graph (CFG) of the target program may be constructed using the CFG generation algorithm 202. The CFG may be a directed graph where each node represents a corresponding one of the code blocks 102, and edges between nodes show the possible flow of control between the code blocks 102. The memory address of the first instruction of each code block 102 may be a numerical representation identifying the corresponding node of the graph.

The CFG generation algorithm 202 takes as inputs the assembly code ASM of the target program, a list of user-selected functions F∈ASM, and a set of user-defined edges U obtained from a dynamic analysis and/or security requirements. Providing user-selected functions F as an input enables users to dedicate monitoring resources to a targeted subset of functions of the target program. However, in some examples, F may be a complete set of functions in the target program instead of a subset thereof. Alternatively, or in addition, the set of functions F may be determined by the CFG generation algorithm 202 using one or more criteria instead of being input to the CFG generation algorithm 202. The set of user-defined edges U may enable the capture of additional program behavior by setting one or more attributes of the edges, such as expected memory access rate or expected execution time within code blocks 102 and/or functions.

The algorithm 202 starts by iterating over the list of user-selected functions (F). For each function, the algorithm 202 finds the function in the assembly code ASM, and partitions the function into code blocks 102 as described above, and the code blocks 102 are included in a set B. A node in the CFG is created for each corresponding one of the code blocks 102.

From lines 2 to 22 of the CFG generation algorithm 202, the algorithm 202 iterates over each code block 102, inspects the last instruction (the branch instruction 108) of the code block 102, identifies the branch type using a complete set of the branch instructions 108 in the ISA, examples of which are shown in Table 2, and then creates edges and sets their attributes. An expected branch target and a label may be set for each of the edges. The expected branch target attribute is the valid branch target expected to be observed when the CPU executes the last instruction of each code block 102. The label attribute may identify the type of the branch instruction 108. As described further below, these two attributes may be used to create security policies for each control-flow transfer.

For a UNCOND_DIRECT branch instruction, a directed edge is created between the current node and the node representing the code block 102 that contains the branch target. If the branch instruction 108 of the node is COND_DIRECT, two edges are created. First, a directed edge is created between the current node and the Taken node, and then a directed edge between the current node and the Not-Taken node. The Taken node contains the branch target that results when the conditions on which the conditional branch instruction depends are satisfied. The Not-Taken node is the next sequential code block 102 following the current node's code block 102 because the conditionality check for the jump was not satisfied.

Figure 3:
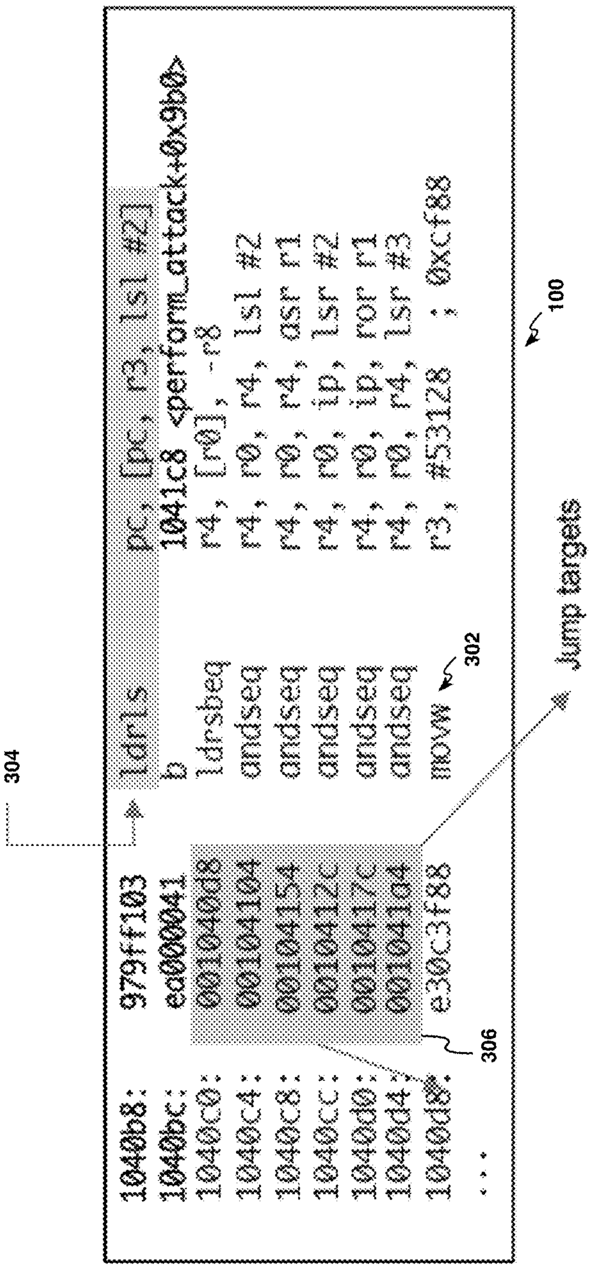
FIG. 3 illustrates an example of the code snippet that includes an indirect jump instruction and a corresponding jump table.

UNCOND_INDIRECT and COND_INDIRECT branch instructions are processed similarly to their "DIRECT" counterparts, except the targets of some indirect branch instructions are unavailable at compile time. In those instances, U is assumed to contain the endpoints of those indirect branches. If endpoints of indirect edges are not found in U, the algorithm 202 may label those indirect edges as UNKNOWN. The user may then decide how to handle those edges. Where edges are labelled UNKNOWN, the indirect branches may target function entries such as in some coarse-grained CFI mechanisms, such as the coarse-grained CFI mechanism described in T. Kawada, S. Honda, Y. Matsubara, and H. Takada, "Tzmcfi: RTOS-aware control-flow integrity using trustzone for armv8-m," *International Journal of Parallel Programming*, vol. 49, pp. 216-236, 2021. Alternatively, a combination of static and dynamic analyses may be used to determine indirect branch targets and supplied as user-defined edges to the algorithm 202. Some indirect branches (for example, function returns and branches to jump tables) may be determined statically. For example, a function return may be inferred directly from code as the location of the next sequential instruction 106 following a function call instruction. Also, jump tables are usually close to their corresponding jump instructions. Therefore, those jump targets may be determined statically using heuristic means. FIG. 3 illustrates an example of the code snippet 100 that includes ARMv7-R assembly code 302 comprising an indirect jump instruction 304 and a corresponding jump table 306 located adjacent to the indirect jump instruction 304.

Finally, although interrupts and a scheduler may call ISRs and context switch routines unpredictably in real-time programs, their code may be statically analyzed and included in the CFG to subsequently construct appropriate policies in a security automaton generation algorithm. Edges involving ISRs and CTXs may be appropriately labelled ISR_ENTRY, ISR_RETURN, CTX_ENTRY, or CTX_RETURN to enable a runtime verification described further below. For example, if the code block 102 from which the edge starts is, or is included in, an ISR, and the branch instruction type is FUNC_RETURN, then the edge may be labelled an ISR_RETURN. Alternatively, if the code block 102 of the branch target is, or is included in, an ISR, then the edge may be labelled an ISR_ENTRY. However, if both (1) the code block 102 from which the edge starts is, or is included in, an ISR, and (2) the code block 102 of the branch target is, or is included in, an ISR, then the label of the edge may remain the label corresponding to the branch instruction type of the branch instruction 108 at the end of the code block 102 from which the edge starts. As another example, if the code block 102 from which the edge starts is, or is included in, a context switch handler, and the branch instruction type is FUNC_RETURN, then the edge may be labelled an CTX_RETURN. If the code block 102 of the branch target is, or is included in, a context switch handler, then the edge may be labelled an CTX_ENTRY. However, if both (1) the code block 102 from which the edge starts is, or is included in, a context switch handler, and (2) the code block 102 of the branch target is, or is included in, a context switch handler, then the label of the edge may remain the label corresponding to the branch instruction type of the branch instruction 108 at the end of the code block 102 from which the edge starts.

When an edge is said to have a label, this may also include an example where the starting and/or ending code block 102 of the edge has the label as an attribute as opposed to the edge construct itself. For example, step 5 of the CFG generation algorithm 202 example in FIG. 2 refers to setting the label of the edge, e, whereas steps 11-22 refer to setting the label of the starting code block 102. Because edges to and from ISRs and CTXs may only be known at runtime, an implementation of CFG generation algorithm 202 may initially identify return edges of ISRs and CTXs as "virtual" edges in step 3. Then at steps 11 to 22 entry and exit nodes of ISRs and CTXs may be labelled concretely to mark known endpoints of these edges. This way, the security automaton generation algorithm may subsequently identify these "virtual" edges and set the appropriate security policies. An edge can have only ONE edge type. In some examples, an edge may have only one label. For example, if the edge is first labeled FUNC_RETURN and is later labelled ISR_RETURN, then the edge may be said to be labelled only ISR_RETURN.

From the CFG, we construct the EFSM implemented as a Security Automaton. While researchers have used classical automatons in automaton-based anomaly detection schemes, the classical automaton is limited in its modeling capabilities. For example, consider an automaton ($\Sigma$, S, $s_0$, $\delta$, F), where S is a set of states;

$s_0$ is an initial state, an element of S;

$\Sigma$ is a finite non-empty set of symbols;

$\delta$ is the transition function $\delta$:S×Y→S;

F is a set of final states.

Researchers have used the set of input symbols $\Sigma$ to model single program behaviors such as a set of branch targets or the instruction space. However, with such solutions, it is unclear how to model additional program behaviors (for example, maintaining a shadow stack). In contrast, we provide a more expressive execution model that includes internal state data, such as a shadow stack, in the transition decision. We model program behavior using an automaton obtained by describing an EFSM as a tuple (S, $s_0$, T), where:

S is a finite non-empty set of states;

$s_0$ is an initial state, an element of S;

T is the transition matrix T:(S×S)→(L×G×F×U):

L is a set of transition labels;

G is a set of Boolean guard functions;

F is a set of output functions; and

U is a set of update functions.

L models the category of the branch instructions 108 described in Table 1. G models Boolean functions used as guard functions. Guard functions are functions that determine when to fire transitions. For example, the function g(b, s)→{true, false} defined for the transition $S_i$→$S_j$ takes as inputs a branch target, b, the top of the shadow stack, s, and determines whether to allow the transition (true) or not (false). F models output functions. The output functions determine the outputs of the model when the transition fires. For example, the output function f: S→r∈{valid, suspicious, invalid} reports to an upper layer function if the transition to the state S is valid, suspicious, or invalid. Finally, U represents functions that update internal persistent data, such as the shadow stack.

With this construction, more program behaviors may be modeled using the transition matrix. For example, to track execution time, the anomaly detection system compares measured values of the benign program at deployment (expected values) with runtime values to detect temporal anomalies. The anomaly detection system may enable time automata capabilities by using update functions to calculate the runtime execution time of code blocks 102 or functions and guard functions to verify runtime execution times against known values. The EFSM model, thus enables us to construct a security automaton that is more expressive than a classical state machine.

FIG. 4 shows an example of a security automaton generation algorithm 402. The security automaton generation algorithm 402 may be used to construct the security automaton. A security policy may be a valid action or condition that must be satisfied to allow a transition from one automaton state 504 to another. The security automaton generation algorithm 402 initializes the set of automaton states S to the set of code blocks 102B (nodes) in the CFG and assigns the initial state. The security automaton generation algorithm 402 then iterates through each pair of states in Sand assigns security policies (for example, guard functions and update functions) to each pair of states based on the edge type determined by the label attribute. All transitions may include guard functions to verify CFG-based expected branch targets from observed values at runtime. The automaton may track each function call location for fine-grained tracking of function returns. Therefore, each transition representing a function call has a security policy to push the call location onto a shadow stack. This way, each transition representing a function return may verify the call location by inspecting a corresponding pop from the shadow stack. Similar to function returns, tracking ISR and context switches uses knowledge of their return locations. The algorithm 402 thus specifies, via update functions, to determine and push the return locations onto an exception stack at runtime and verify when the ISR or context switch function returns. The exception stack is a runtime storage for tracking exception returns. As a context switch function may return to a different task than the one preempted, each time a context switch occurs, the return location must be determined at runtime and saved against the identifier of the interrupted task. When the context switch function returns, the automaton may transition to a return state previously saved by the incoming task when the incoming task was preempted. Note that user-defined functions may be used to define additional security policies such as temporal characteristics.

FIG. 5 illustrates an example of the output of the security automaton generation algorithm 402. Each row of the table in FIG. 5 corresponds to a transition 502 from one automaton state 504 to another. The transition 502 may include a transition label 506 and a security policy 508. The security policy 508 for the transition 502 may include one or more guard functions 510. In some examples, the security policy 508 for the transition 502 may include one or more update functions 512. Alternatively, or in addition, the security policy 508 for the transition 502 may include context data 514.

The translation label 506 may be derived from the branch type for the transition 502. The temporary transition label (REGULAR) in the first row of the table in FIG. 5 identifies all types of transitions 502 except those that represent function calls, function returns, ISRs, and context switch routines. As shown in row 1, such transitions 502 may include one security policy 508, namely, the guard function 510 configured to verify that the runtime branch target is the valid branch target per the CFG ("b==branch_target"). In other words, the transition 502 from the automaton state 504 $S_a$ to the automaton state 504 $S_b$ may include the guard function 510 configured to confirm that the code block 102*b*, represented by the automaton state $S_b$, is the branch target during runtime.

As shown in rows 2, 4, and 6, the security policies 508 for function calls, ISR entries, and context switch routine entries may be configured to verify that the runtime branch target is the valid branch target per the CFG and to push their return locations onto appropriate stacks.

Because of the unpredictable nature of ISRs and context switches, the examples in rows 5 and 7 (ISR_RETURN and CTX_RETURN) include runtime checks that are to be performed when the ISRs and context switches return. The checks involve retrieving saved return locations (r/runtime) from automaton-maintained runtime stacks and comparing the retrieved return locations with corresponding runtime branch targets reported by the trace mechanism. Context switch transitions 502 use the context of execution (task/D) to maintain associated runtime stacks. As shown in row 3, a similar check may be performed for regular function returns; however, when a function returns, its call location (that was pushed onto the shadow stack during the call and is known statically) must be at the top of the shadow stack. The retrieved call location ($cl_{runtime}$) from the runtime stack is thus compared with the statically known call location (c/static), which was included in the context data 514. This comparisons verifies that functions that are called from any location in the program return to their valid return locations.

In some examples, a temporal behavior of the target program may be tracked for anomalies. To do so, users may define security policies 508 to specify when to start and stop a timer to measure execution time for comparison with expected values, such as the examples shown in rows 2 and 3 (transitions 502 labeled FUNC_CALL and FUNC_RETURN) in the table shown in FIG. 5. In the illustrated example, the update function 512 indicates a timer is started when the transition $S_j$ to $S_k$ occurs by calling start_time( ). When the transition $S_j$ returns to $S_d$, the guard function 510 indicates the execution time, $t_{runtime}$, detected at runtime is obtained by calling stop_timer( ), and the magnitude of the difference between the execution time, $t_{runtime}$, and an expected execution time, $t_{static}$, is confirmed to be less than or equal to an acceptable margin of error, $\in$. The expected execution time, $t_{static}$, and the acceptable margin of error, $\in$, may be determined during a testing phase, which is described further below. The expected execution time, $t_{static}$, may be, for example, an average measured elapsed time for the function to execute during a testing phase, a maximum measured elapsed time for the function to execute, or any other determined execution time. The acceptable margin of error, $\in$, may be selected as a system-wide value, a function-specific value, or any other type of margin of error. The expected execution time, $t_{static}$, for example, may be included in the context data 514. The context data 514 may be any data relied on by the security policies 508 in addition to the current and next states 504. The context data 514 may be analogous to the data section in program memory where program constants are stored. Offline-generated constant data, such as function call locations and measured temporal data, may be saved as context data 514 in the automaton.

An implementation of the security automaton generation algorithm 402 generates the security automaton for the target program. In some examples, custom logic may be required to implement the runtime security policies 508 defined in the automaton. This logic verifies program behavior by implementing the update functions 512 and/or the guard functions 510. Any violation of the security policies 508 may be declared as an anomaly by the custom logic and reported. Runtime execution traces from the target program may be required as inputs to the update functions 512 and/or the guard functions 510. Researchers have instrumented target programs to export traces for verification. However, we may avoid the associated performance overhead by using hardware support to export execution information.

Hardware Support

Our second goal is to impose negligible overhead. In some examples, imposing negligible overhead may rule out code instrumentation and processor redesign to acquire runtime trace information. Therefore, we may depend on hardware support to provide the runtime information needed. Platform vendors provide specifications for such hardware support (for example, ARM, RISC-V, Infineon, and Intel) to integrate execution trace mechanisms into systems featuring their processors. The execution trace hardware may be any real-time module that provides the execution trace for a processor without substantially interfering with the processor's operation. This may ensure the processor incurs substantially no overhead in the anomaly detection process, and the anomaly detection system may obtain execution information such as branch targets, instruction timestamps, and memory access patterns. In some offerings, such as ARM Core-Sight, trace data may be accessed and processed internally in real-time on the platform or streamed off-chip for external processing. In some examples, the trace stream may be protected from physical threats; therefore, trace hardware configuration such as the former is preferred. This preference ensures the anomaly detection system enjoys the maximum physical protections the platform provides. Like the specifications from other suppliers, the ARM CoreSight specification describes the components and protocols required to implement this feature on ARM-based systems. Integrators may integrate this into ASIC designs or utilize COTS chips such as Xilinx's Zynq Ultrascale+, which has already implemented the technology. Integrators include anyone implementing the anomaly detection system on a target platform.

Example Architecture

Figure 6:
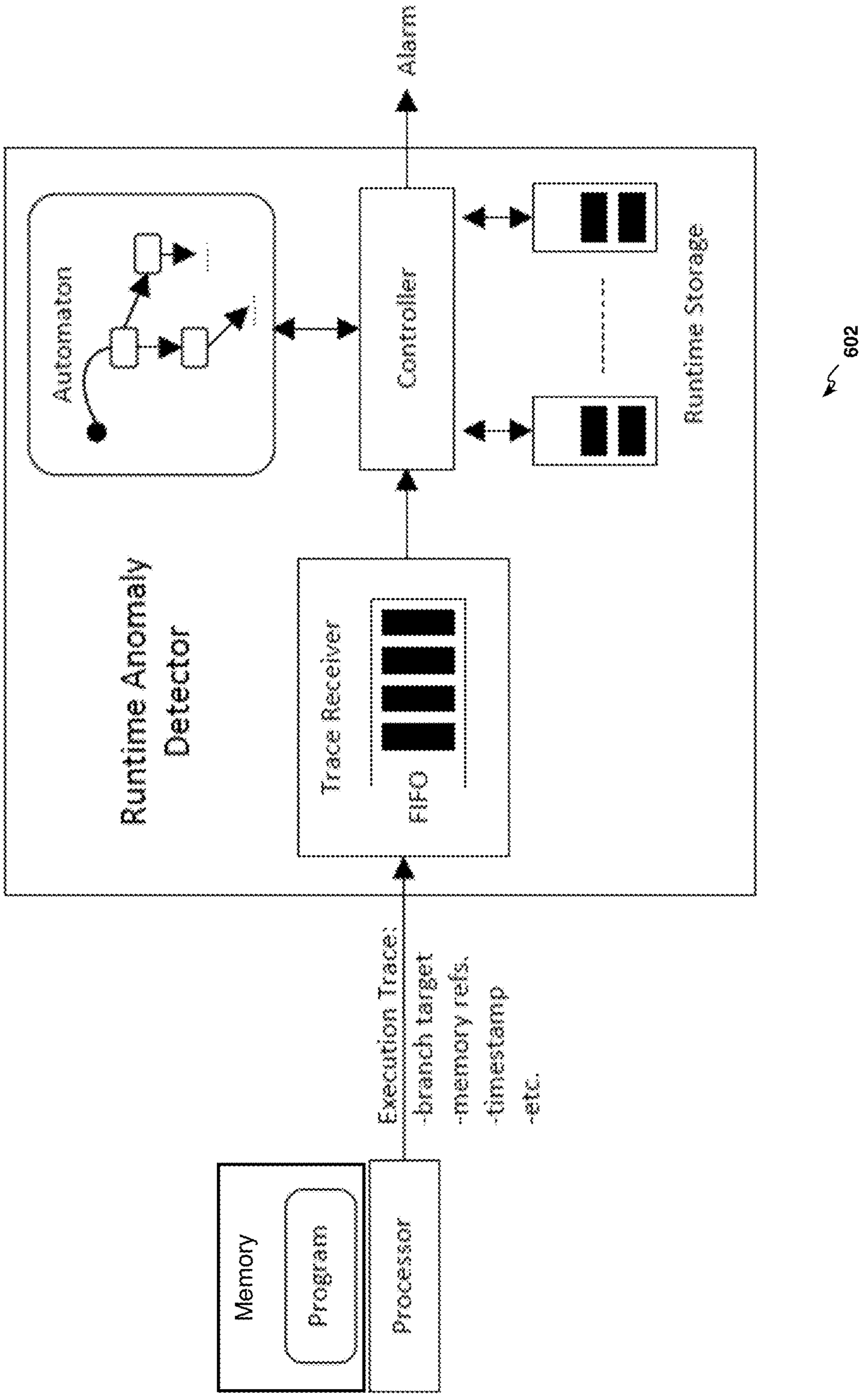
FIG. 6 illustrates an example of an anomaly detection system.

FIG. 6 illustrates an example of an anomaly detection system 602 having a reference architecture for realizing the anomaly detection. In the example, the anomaly detection system 602 comprises the monitored program (in other words, the target program), a processor that executes the program, execution trace hardware (such as one provided by a supplier of the processor), and a runtime anomaly detector. The runtime anomaly detector may include a trace receiver, the security automaton, a controller, and runtime stacks. The runtime stacks may be included in the runtime storage. The security automaton and the runtime stacks may be auto-generated from the target program's assembly code and user-defined policies using the CFG generation algorithm 202 and the security automaton generation algorithm 402 as described above. The security automaton and the runtime stacks may form the heart of the anomaly detection system 602. The trace receiver interfaces with an execution trace hardware (not shown) or system bus (not shown) to receive and condition an execution trace for validation by the runtime anomaly detector. In the illustrated example, the execution trace is generated by execution trace hardware included in the processor. Note that the execution trace input rate may be greater than the processing rate of the anomaly detection system 602. A First-In-First-Out (FIFO) buffer within the trace receiver enables greater flexibility in processing speeds and may act as a contingency for periods of high data rate of runtime execution information received by the trace receiver from the trace hardware or bus. Depending on the desired behavior of the target program, the execution trace may include the program counter, branch targets, timestamp, memory access patterns, or any combination thereof.

The controller of the runtime anomaly detector may manage the entire operation of the anomaly detection system 602 shown in FIG. 6. In the illustrated example, the controller receives the processed execution trace from the trace receiver, manages the Runtime Storage, and executes the security policy 508 (guard functions 510 and update functions 512) defined in the security automaton to verify program behavior. An alarm signal may be raised when abnormal program behavior is detected. An alarm signal may be used to drive a non-maskable interrupt to the CPU hosting the target program for appropriate action to be taken in response. The alarm signal may also drive input into an intrusion response mechanism on the same platform or in another component. The location of the response mechanism may be important because attackers may manipulate the integrity of the alarm signal to invalidate the efforts of the anomaly detection system 602. Therefore, a response mechanism on the same chip as the anomaly detection system 602 is recommended to provide the maximum physical security the platform provides. Integrators may also take measures to protect the alarm signal against manipulation.

For practical purposes, a description of how the proposed scheme may seamlessly integrate into industry development processes is provided below.

Deployment Workflow

The practicality of deploying any defense scheme significantly impacts its adoption. Our third goal focuses on this aspect of the framework. The security automaton is application-specific; therefore, hand-coding a security automaton for each new program or program update is impractical. The CFG generation algorithm 202 and the security automaton generation algorithm 402 described herein may automate the process of generating the security automaton. For example, the CFG generation algorithm 202 and the security automaton generation algorithm 402 may be easily implemented in Python and seamlessly integrated into Continuous Integration (CI) tools across system development processes without expert knowledge of the scheme. The generated code in the security automaton may form the central component of the anomaly detection system 602. Depending on the platform that the anomaly detection system 602 is to be implemented, the generated code may be generated in any language of choice, for example, C, assembly, and/or a hardware descriptive language (HDL). The anomaly detection system 602 may be implemented in software and deployed on an adjacent core or processor in a multiprocessor environment; however, the process or environment executing the anomaly detection system 602 is to be protected from tampering. For example, the anomaly detection system 602 may be executed in a secure enclave. A secure enclave software may be a hardware component that protects sensitive data by isolating the sensitive data from the main processor. In some examples, the anomaly detection system 602 may be implemented in hardware and deployed in internal FPGA fabric to take advantage of platform protections. In some examples, the anomaly detection system 602 may be an ASIC implementation.

Figure 7:
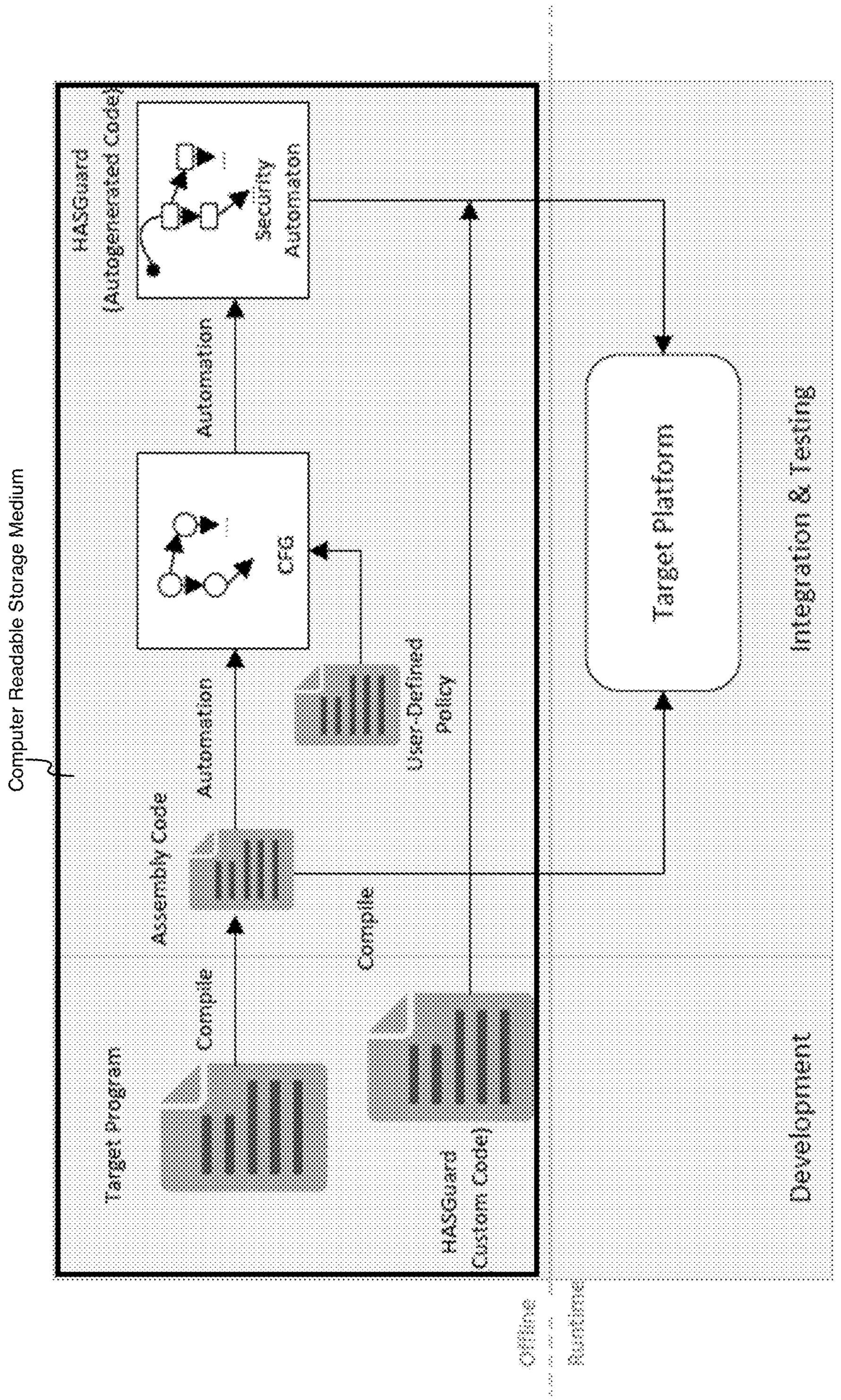
FIG. 7 illustrates an example workflow to generate a security automaton.

FIG. 7 illustrates an example workflow to generate a security automaton. System development is generally a multi-stage process in industry. Development processes such as the Waterfall have a Development, Integration, Testing, and Deployment stage where hardware and software systems are developed, integrated, tested, and deployed. To support these standard development process stages, the example workflow shown in FIG. 7 may be quickly adopted. The fixed platform-dependent code (not shown) required to interface the anomaly detection system 602 with the platform may be developed once and included alongside the target program during the Development stage. Continuous Integration (CI) tools may then automatically generate the program-dependent aspects of the anomaly detection system 602 using implementations of the CFG generation algorithm 202 and security automaton generation algorithm 402 each time a new or updated target program needs protection. The only input from integrators may be a static XML or similar input file that defines the following: (1) a list of the most security-critical functions of the program; and (2) user-defined security policy containing tuples of CFG edges (for example, obtained via dynamic analysis) and other measured data. As an example of such a tuple, the transition 502 including the values (**10172*c*, 101638, FUNC_CALL, t=100, m=30) may define a valid control-flow transfer from CFG node 10172*c* to 101638, labeled as a function call, requires 100 CPU cycles to complete the transition 502**, and requires 30 memory references. Integrators may obtain a list of security-critical functions through risk assessment activities or tools such as Microsoft's STRIDE. STRIDE stands for Spoofing, Tampering, Repudiation, Information Disclosure, Denial of Service, and Elevation of Privilege.

The object code of the target program and the object code or bitstream of the security automaton and custom code may be flashed onto the target platform and executed in parallel during testing. At this stage, program characteristics such as memory access patterns and/or timing behavior may be measured and collected. The program characteristic collected during testing may be used to construct security policies 508 in the XML input file during deployment. The development environment may be assumed to be trusted during the collection of these program characteristics.

Control-Flow Monitoring in Baremetal Programs

CFI is an effective defense against code-reuse attacks such as ROP and JOP that hijack control-flow. Control-flow transfers in the entire program may be monitored to detect such violations effectively, but that may be resource-prohibitive and sometimes unnecessary in large programs. In such instances, security-critical parts of the code, determined by risk assessment, may be monitored to conserve resources. For example, suppose the C runtime environment is trusted in an embedded system. In that case, an effective approach is balancing security and resource utilization by monitoring security-critical functions and leaving trusted functions such as standard C library functions and system calls out of security monitoring. If desired, the anomaly detection system 602 may verify calls to and returns from such functions without tracking their internals.

Figure 9A:
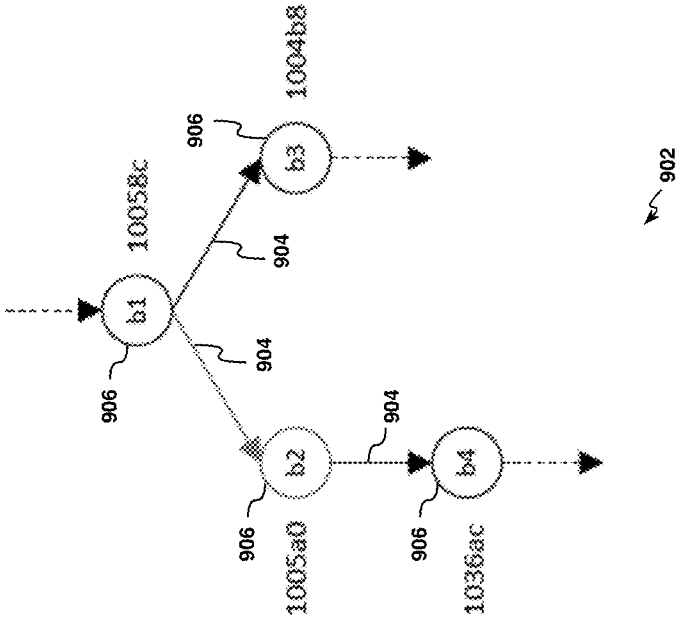
FIG. 9A illustrates an example of the CFG for the code snippets in FIG. 8 before the CFG is pruned.
Figure 9B:
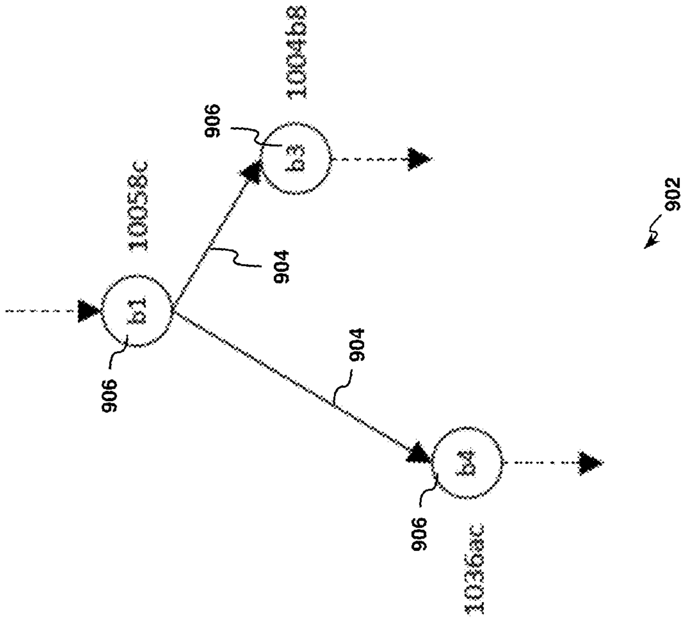
FIG. 9B illustrates an example of the CFG for the code snippets in FIG. 8 after the CFG is pruned.

Another optimization opportunity is to reduce the size of the CFG without compromising security. In systems with W ⊕ X protections where code sections in memory are protected with MPUs to prevent threats of code injection, conditional nodes in the CFG generated by the CFG generation algorithm 202 may be optimized to unconditional nodes. FIG. 8 illustrates example of code snippets 100 written in Armv7-R assembly code that may help to illustrate this optimization technique. The branch instruction 108 at 0x0010059c in the illustrated example is "bne," which means branch on not equal. In this case, the branch instruction 108 is conditional on the results of the instruction at 0x00100598. If the content of r3 is zero, execution will continue sequentially from 0x00100598 until the instruction at 0x001005a8 is executed. The program counter (PC) will then jump to the branch target 0x1036ac. This path may be called the false path because the path is taken when the conditional branch is not taken because the condition is false. Alternatively, if the content of r3>0, the PC will jump to 0x001004b8 when the branch instruction 108 at 0x0010059c is executed. We call this path the true path. Because an attacker cannot modify direct branches because of W ⊕ X protections, we may optimize the CFG by only following the true path without losing security. Thus, we may prune node b2 out of the CFG and connect node b4 directly to node b1, as shown in FIGS. 9A and 9B. FIG. 9A illustrates the example of the CFG 902 for the code snippets 102 in FIG. 8 before the CFG 902 is pruned. FIG. 9B illustrates the example of the CFG 902 for the code snippets 102 in FIG. 8 after the CFG 902 is pruned. Before the pruning, two edges 904 exist between nodes 906 b1 and b4. After the pruning, only one of the edges 904 exists between nodes 906 b1 and b4. The edge 904 representing the true path, which is between nodes 906 b1 and b3, remains the same before and after the CFG 902 is pruned.

We may also minimize trace traffic by configuring the trace generation hardware to generate trace only when conditional branches are taken (follows the true path). FIG. 10 illustrates a pruning algorithm for optimizing the security automaton. The pruning algorithm starts by searching for all nodes 906 in the CFG 902 representing conditional branches (we refer to them as Conditional Root nodes). It iterates through all Conditional Root nodes in G. At each node, the pruning algorithm identifies the true and false child nodes representing branch targets when the conditional instruction evaluates to "true" or "false" respectively. We refer to them as Conditional True and Conditional False nodes respectively. The edges 904 leading to these nodes 906 are described similarly. At each Conditional Root node, the edge 904 leading to the Conditional False node is marked for deletion, as well as the Conditional False node itself. The algorithm bypasses the Conditional False node by creating directed edges from the Conditional Root node to all children nodes of the Conditional False node that are themselves not Conditional False nodes. This action effectively isolates the Conditional False node, which may be deleted if it has no incoming edges 904. All Conditional False edges are deleted. The compressed graph is then returned. In some examples, up to a 16% reduction in the number of nodes 906 and up to a 14% reduction in the number of the edges 904 has been observed during experimentation.

The anomaly detection system 602 enables modeling additional program behaviors to increase the scope of detectable anomalies. The forward context requirement described earlier is an example of valid behavior that may be modeled. To model the valid behavior of the callbacks, we encode the valid paths as the security policy 508 in the security automaton. Policies to enforce backward and forward context sensitivity are described in detail in the section entitled "Handling Context Switch" below.

FIG. 11 illustrates examples of the security policies 508 to enforce backward and forward context sensitivity for an example set of transitions 502. Consider an example where two paths lead to a function E( ). In a first path, a function A( ) indirectly calls B( ) which indirectly calls E( ). In a second path, C( ) indirectly calls D( ), which indirectly calls E( ). For backward edges (edges 904 followed when a function returns), the PC should return rightfully to B( ) only when the path A→B→E was taken. Similarly, E( ) should return to D( ) only when the path C→D→E was taken. Context-insensitive CFI will incorrectly allow E( ) to either return to B( ) or D( ).

Another issue may arise for forward edges (edges 904 followed when a function is called) involving callback functions. A callback function is a function whose address is passed to a second function as an argument, which is then invoked inside the second function to complete some kind of routine or action. Suppose both B( ) and D( ) call E( ) with callback arguments $cb_B$ and $cb_D$ respectively. Context-insensitive CFI will allow either callback regardless of how E( ) was reached. However, the paths E→$cb_B$ and E→$cb_D$ are only valid when E( ) was reached from B( ) and D( ) respectively.

To enforce the context of returns from calls to E( ) (backward edges) along the paths A→B→E and C→D→E, the security policies 508 created include regular function return policies such as is shown in the last two rows in FIG. 11. Suppose B' and D' are call locations in B and D, respectively, from which E is called. Suppose further that the return locations B" and D" are locations in B and D, respectively, to which E may return. The security policies 508 in the last two rows of the transitions 502 in FIG. 11 ensure the transitions 502 from $s_E$ are valid only if: (1) the context (in this scenario, the call location) is the correct one of B' or D', and (2) the return location is the correct one of B" or D". The call locations are known at compile time and are pushed onto the shadow stack (ss) at runtime when functions are called so that they may be used for verification when the functions return. Return locations are also known at compile time and are stored in the automaton.

Calls to, and returns from, callbacks may be specified similarly. However, additional policies to enforce forward context are created. To enforce the forward context of calls to callback functions $cb_B$ and $cb_D$, the security policies 508 in rows 3 and 6 are created. These two security policies 508 help ensure the transitions 502 from $s_E$ to the state $S_{cbB}$ or $S_{cbD}$ are only allowed when the context data 514 (call path) contains Band D respectively for calls to callback functions $cb_B$ and $cb_D$. This may be verified at runtime before the transitions 502 to the corresponding states 504 are allowed. Like call locations, the historical paths B and D are known at compile time and may be tracked with the forward stack ($f_s$). The Context Data column shows context data 514 (such as function call locations and historical paths) that may be needed by the security policies 508 for runtime verification.

The security policies 508 that cannot be automatically determined via static analysis may be manually added as user-defined policies. The CFG generation algorithm 202 identifies indirect branches that could not be resolved statically as UNKNOWN edges. Dynamic analysis may resolve those edges 904 and be incorporated as user-defined policies. Similarly, behaviors such as valid forward context paths described above may be manually added.

Example Implementation

An FPGA implementation of the anomaly detection system 602 may include an implementation of the security automaton in HDL. In one example, a custom Python implementation of the CFG generation algorithm 202, the security automaton generation algorithm 402, and the pruning algorithm is executed to construct the program-specific security automaton in VHDL code. VHDL (VHSIC Hardware Description Language) is an HDL that models the behavior and/or structure of digital systems at multiple levels of abstraction, ranging from the system level down to that of logic gates. Additional custom VHDL code may be developed to implement other components of the anomaly detection system 602. The custom Python implementation may alert developers of indirect branch locations that may require extra security enforcement. Developers may respond by constructing more security policies 508. User-defined security policies 508 for the target program may be captured as tuples of CFG edges 904 in an XML input file for the CFG generation algorithm 202. The output VHDL modules may represent the target program's CFG 902 and security policies 508 modeled with an automaton to verify control-flow transfers at runtime on, in this example, a Xilinx Zynq Ultrascale+ZCU-104 development board.

Figure 12:
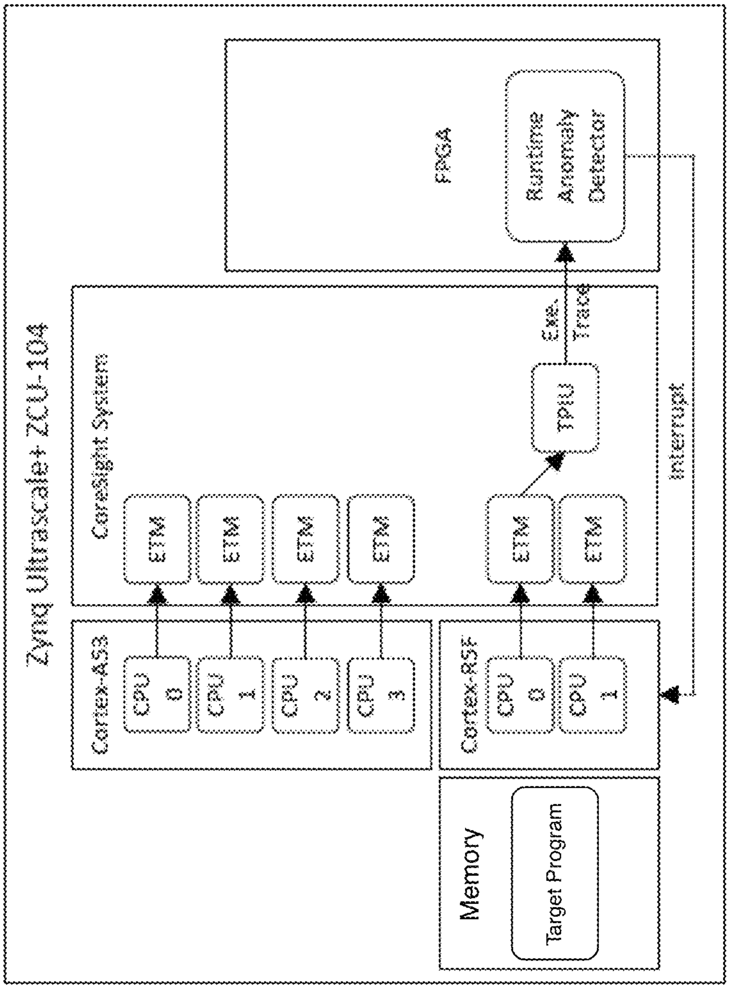
FIG. 12 illustrates an example of the overall system architecture on the Ultrascale+platform.

The ZCU-104 features a duo-core ARM Cortex-R5F processor, a quad-core ARM Cortex-M53 processor, and FPGA fabric. The anomaly detection scheme may be implemented as an FPGA module that monitors control-flow violations in the target program on the Cortex-R5F processor configured to run at 500 MHz. FIG. 12 illustrates an example of the overall system architecture on the Ultrascale+platform. The section below entitled Runtime Anomaly Detection System for Baremetal Programs describes the architecture of the anomaly detection system 602. Execution traces of the monitored program are captured in real-time from the Cortex-R5F processor using the CoreSight system. Specifically, branch targets are captured and streamed to the FPGA for verification by the anomaly detection system 602 running at 150 MHz. The CoreSight system non-invasively captures execution traces using a collection of hardware modules such as the Embedded Trace Macrocell (ETM) and Trace Port Interface Unit (TPIU). Execution information such as branch targets, time stamps, and data access patterns may be obtained. FIG. 12 shows some of the components of the system and an example of the a trace flow. A detailed description of relevant CoreSight components is covered next.

ARM CoreSight

Some processors from ARM, Intel, Infineon, and others feature hardware modules for capturing execution traces of the processor at runtime. These modules enable debugging and performance monitoring without impacting the processor's performance. The Xilinx Zynq Ultrascale+platform features ARM CoreSight, serving as a hardware execution trace mechanism, which is used by the anomaly detection system 602 in this example implementation. The trace generated by CoreSight is a collection of information such as executed instructions, data transfers, memory references, and timestamps while the processor is running at full speed. The information may be delivered off-chip in real-time or captured in local memory via a dedicated Advanced Trace Bus (ATB).

Figure 13:
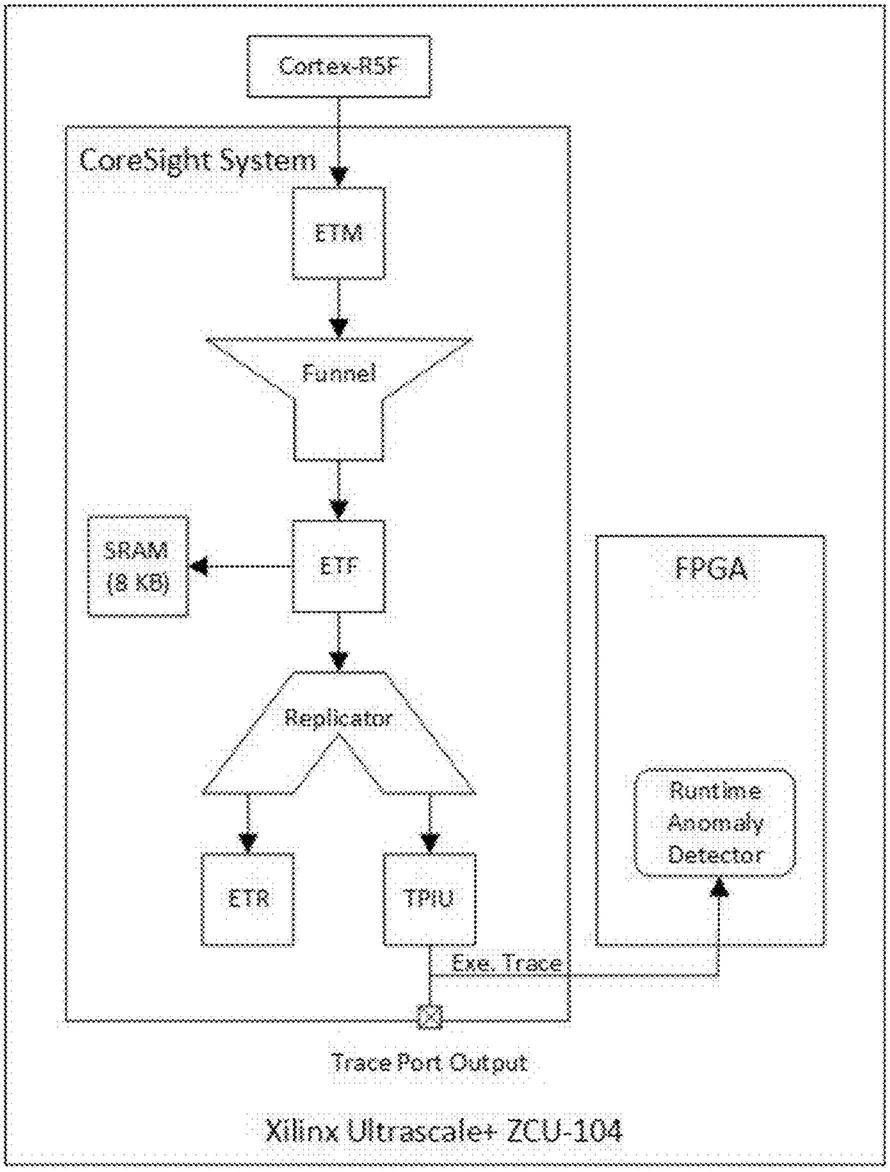
FIG. 13 shows an example of relevant CoreSight components within the Ultrascale+platform.

FIG. 13 shows an example of the relevant CoreSight components. In the illustrated example, CoreSight is configured to export trace information to the runtime anomaly detector in the FPGA fabric.

CoreSight has three main components: trace sources, trace links, and trace sinks. Trace sources, such as the ETM, non-invasively capture and compress traces from the attached processor into packets. Trace links serve as conduits for trace packets, and trace sinks combine packetized traces from several trace sources. Trace sinks serve as bridges to non-CoreSight systems, such as local system memory or externally to a trace capture device. All configurable CoreSight components on the Ultrascale+ are memory-mapped and accessible by privileged software running on-target or off-target via the Debug Access Port (DAP). A CoreSight device driver may be developed for the Xilinx Zynq Ultrascale+platform and the system may be configured for on-target trace streaming. Access to those memory-mapped registers is restricted after configuration by the privileged software. Alternatively, the CoreSight system may be configured and initialized from the FPGA for enhanced security.

The trace source (ETM) captures instruction traces when trace capture is enabled. To limit trace traffic in the system, the ETM compresses trace information into packets using the ETMv3.3 protocol. Additional filtering options are available to restrict further tracing to specific memory regions and events. The output of the ETM flows into a trace funnel, which combines multiple trace sources into a single bus. Trace packets flow through two other trace links: the Embedded Trace FIFO (ETF) and the Replicator. The ETF has an 8 KB internal storage and may be configured as an intermediate on-chip trace storage when the trace is routed through the Embedded Trace Router (ETR) trace sink to a large memory pool such as external DDR. When configured as a trace link, the ETF streams trace packets directly to the TPIU, which then forwards it off-chip. The TPIU output may be streamed into the on-chip FPGA fabric for real-time processing. We use this configuration to stream trace to the anomaly detection module in the FPGA fabric. The device driver for the CoreSight system on Ultrascale+ devices may be configured to capture traces into local DDR memory or off-chip via the TPIU.

Runtime Anomaly Detection System for Baremetal Programs

Figure 14:
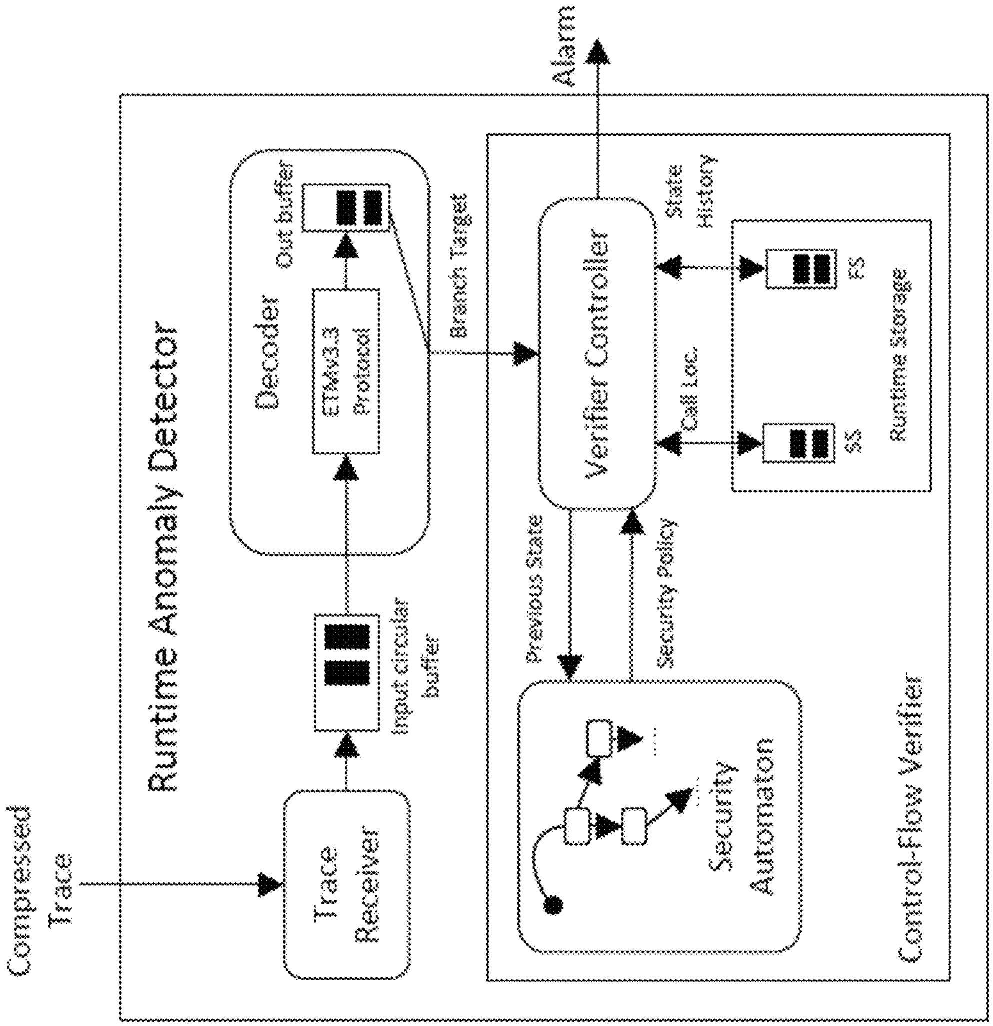
FIG. 14 illustrates example components of an implementation of the runtime anomaly detector.

The runtime anomaly detector is shown in FIGS. 12 and 13 as a module in the FPGA. FIG. 14 illustrates example components of the runtime anomaly detector. The runtime anomaly detector may include components for processing execution traces such as those from the Cortex-R5F processor and using that information to verify control-flow transfers. Top-level components of the runtime anomaly detector may include a trace receiver, a trace decoder (also referred to herein simply as the "decoder"), and a Control-Flow Verifier (CFV).

Trace Receiver

The trace receiver may include a series of custom logic and Xilinx IP blocks that interface with the TPIU. The TPIU output is received via a dual data rate bus, and the Trace Receiver converts the TPIU output to a single data rate and passes the resultant stream into a circular FIFO buffer implemented using, for example, Xilinx IP blocks. When the decoder requests new packets, the FIFO buffer delivers compressed trace packets to the decoder. Buffering may be necessary to account for a potential difference between the processing speed of the decoder and the rate at which trace packets are received by the trace receiver. The data rate of trace traffic ultimately depends on the size of the code being monitored and the number of branch instructions 108 executed by the target program. The buffer may be overflown when the input rate exceeds the data rate of trace processed by an external agent downstream of the TPIU, such as in the runtime anomaly detector. This overflow may lead to loss of trace events and consequently imprecise detection results. This condition may put an upper bound on the amount of code that may be monitored with perfect precision. This upper bound may be determined experimentally. Note that the processing speed and efficiency of the overall anomaly detection system 602 depend on where and how it is implemented and, therefore, is under the control of the integrator of the anomaly detection system 602.

Trace Decoder

The trace decoder may be custom logic that accepts compressed trace packets from the input FIFO and decompresses the compressed trace packets using the ETMv3.3 protocol. The decoder may synchronize data flow into the FIFO, label each byte in the FIFO, decompress each trace packet, and buffer the results in an output buffer. The decoder may accomplish this in three stages. The first stage may involve a data transmission handshake with the input FIFO to avoid the risk of overwriting unprocessed data. The decoder may also label unprocessed bytes into trace packets according to the packet headers defined in the ETM protocol. Each trace packet may contain one or more bytes, depending on the packet type. Tagged bytes are examined in the second stage to decompress them. Packets relevant to the anomaly detection system 602 are decoded to extract execution information using the packet definition of the ETM protocol. If the decoder cannot extract useful information from a given byte, the decoder may ignore the byte and move on to the next byte. The final stage may include the decoder writing correctly decompressed trace data into the output buffer, ready to be consumed by the CFV. If the output buffer is about to overflow as a result of a high rate of decompressed trace, the decoder may trip a flag that halts the labeling and processing stages. Once the output buffer is no longer in danger of being overwritten by new data, the decoder may release the flag, enabling the labeling and processing stages to resume operation. The input FIFO may be responsible for buffering compressed trace during this time. In some examples, the FIFO may be 1024 words deep, which is a large enough buffer to maintain correct operation during more extended periods of high trace activity. However, if the rate of trace transmission remains higher than may be processed for a long enough time, the trace may be eventually be dropped, leading to imprecise detection results.

The ETM may be configured to capture various kinds of execution information. Examples include branch targets, data accesses, timestamps, and execution context. Per the ETM specification, there are over 20 trace packet types, each containing execution information that the ETM may output. Even though the ETM is configured to capture only branch targets, the protocol automatically transmits other packets that report trace synchronization, the context of trace packets, etc. Therefore, the decoder may inspect all packets emitted by the ETM and filter for only relevant information, such as branch targets. The trace packets' multi-byte nature and some of the ETM protocol's undocumented behavior may make the decoder challenging to implement in some examples. The decoded branch targets may be streamed to the CFV module, shown in the lower part of FIG. 14, for verification of control-flow transfers.

Control-Flow Verifier for Baremetal Programs

Each received branch target from the decoder may be evaluated against the security policy 508 defined by the security automaton in the CFV. In the illustrated example, the CFV includes the Security Automaton, the Verifier Controller, and Runtime Storage.

Figure 15:
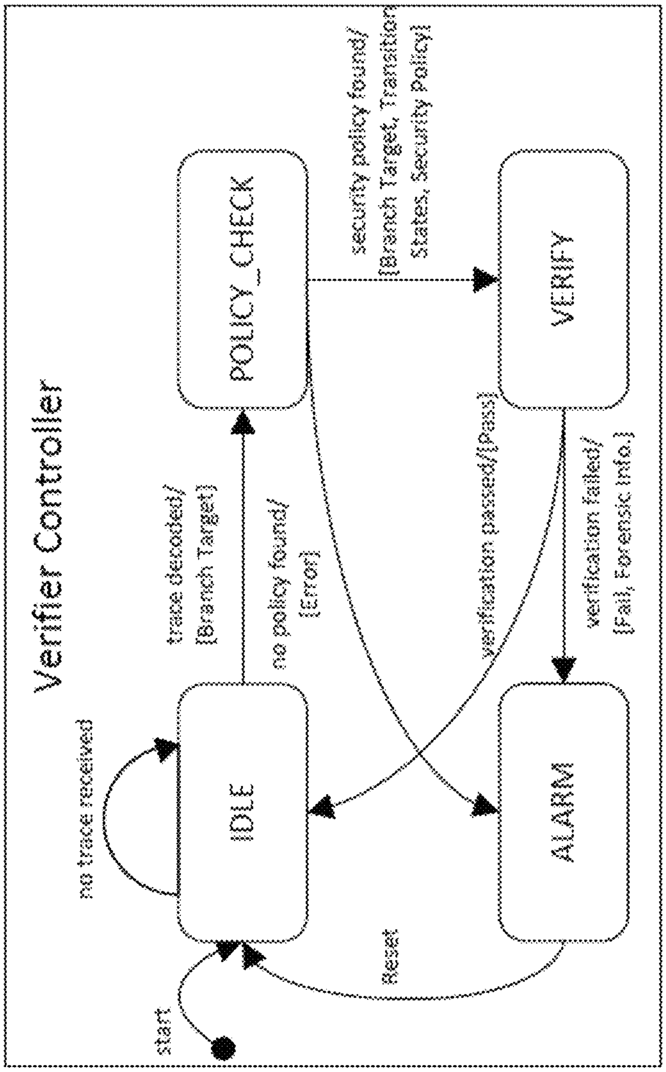
FIG. 15 illustrates an example of a state machine implementation of the verifier controller.

The Verifier Controller coordinates the operation of the submodules of the CFV. This is custom code written once for a given platform. The Verifier Controller may be implemented as using a state machine. FIG. 15 illustrates an example of a state machine implementation of the Verifier Controller. In the example, at reset, the Verifier Controller goes into the IDLE state and waits until a valid branch target address is received from the decoder. The Verifier Controller then transitions to the POLICY_CHECK state where the Verifier Controller first reads the top of the Forward Stack for the previous state, which the Verifier Controller uses to retrieve all possible following transition states 504, their firing branch targets and associated security policies 508 from the Security Automaton. Suppose the requested information is found in the automaton. In that case, the controller goes into VERIFY, where the Verifier Controller checks the expected branch target for each transition 502 in parallel to verify if the input branch target received from the decoder corresponds to any of them. It also checks if the transition 502 requires extra scrutiny for function returns and forward context-sensitive branches. For function returns, the Verifier Controller pops the shadow stack to verify against the call location that was pushed onto the shadow stack when the function was called. For the forward context policy described in the Control-Flow Monitoring in Baremetal Programs section above, the Verifier Controller pops the Forward Stack to verify if the branch target is valid based on the preceding execution path. Once all checks pass verification, the controller updates the runtime stacks if necessary and enters IDLE, where the Verifier Controller requests the next branch target from the decoder. This transition 502 indicates a valid control-flow transfer. Alternatively, if any verification check fails, which indicates an invalid control-flow transfer was detected, the Verifier Controller flags the control-flow transfer as an anomaly, captures forensic information for the failure event, and enters an ALARM state, where the Verifier Controller may interrupt the processor. The system integrator may decide how to respond by implementing an appropriate ISR to handle the failure event. For example, the ISR may measure detection latency and reset the platform in response to a detected anomaly.

The Security Automaton represents the CFG 902 and security policies 508 converted to an automaton in, for example, VHDL case statements and constants. Security Automaton is generated programmatically using the CFG generation algorithm 202, the security automaton generation algorithm 402, and, in some examples, the pruning algorithm. When instructed to execute by the Verifier Controller, the Security Automaton confirms the validity of the previous state received from the controller. The Security Automaton returns all possible transition states 504 from that state, their labels, their firing branch targets, and information needed to verify the security policy 508 required to transition from the previous state. In some examples, the Security Automaton may report if the input state is invalid, which may happen if the CFG 902 is incorrect.

The Runtime Storage is internal storage for runtime data used by the Verifier Controller to maintain the internal state of the automaton. The Runtime Storage module and the Security Automaton may be generated programmatically. The Runtime Storage implements a Shadow Stack (SS) for tracking the context of function returns and a Forward Stack (FS) for tracking paths in the automaton for verifying forward context to detect attacks such as callback redirection.

The Verifier Controller may include custom code in VHDL. The Verifier Controller is expected to be written once for a given platform in practical deployments once the choice of program behaviors to monitor is selected. The Verifier Controller may remain unchanged even when the Security Automaton changes from application to application. However, the Security Automaton and the Runtime Storage may be regenerated to incorporate corresponding changes each time the target program changes.

Control-Flow Monitoring in Real-Time Programs

The anomaly detection system 602 may model two key semantics of real-time programs: multitasking and interrupts. Regardless of the scheduling algorithm, real-time schedulers select which task to allocate CPU time by performing a context switch. Context switching is accomplished by saving the CPU state corresponding to the currently running task at the point of the context switch and selecting the next task to run by restoring its saved CPU state. Context switching may be implemented using a software interrupt. A software interrupt is generated by executing a specific architecture instruction. Hardware interrupts are mechanisms via which external events interact with the CPU. An Interrupt Service Routine (ISR) is a piece of code executed by the scheduler when an interrupt assigned to the routine occurs. Hardware interrupts are unpredictable and may cause control-flow transfers at any time. The Interrupt Vector Table (IVT) defines a set of entry points for ISRs. The table may be a dedicated memory region explicitly allocated to hold these entry points. Interrupts and context switching may be modelled by, for example, constructing appropriate security policies 508 as described below.

Handling Interrupts

When an interrupt occurs on the CPU, the context of the current task (registers, PC, stack pointer, etc.) is saved. The amount of context and the location it is saved depend on the hardware and the RTOS. The CPU then jumps to an offset in the IVT corresponding to the interrupt to execute its ISR. When the ISR completes (assuming it returns to the interrupted task), the context of the interrupted task is restored, and the task resumes executing from where it was interrupted. An interrupt that returns to the interrupted task may be likened to an unpredictable function call at runtime. Such interrupts may be modelled similarly to function calls.

Figure 16A:
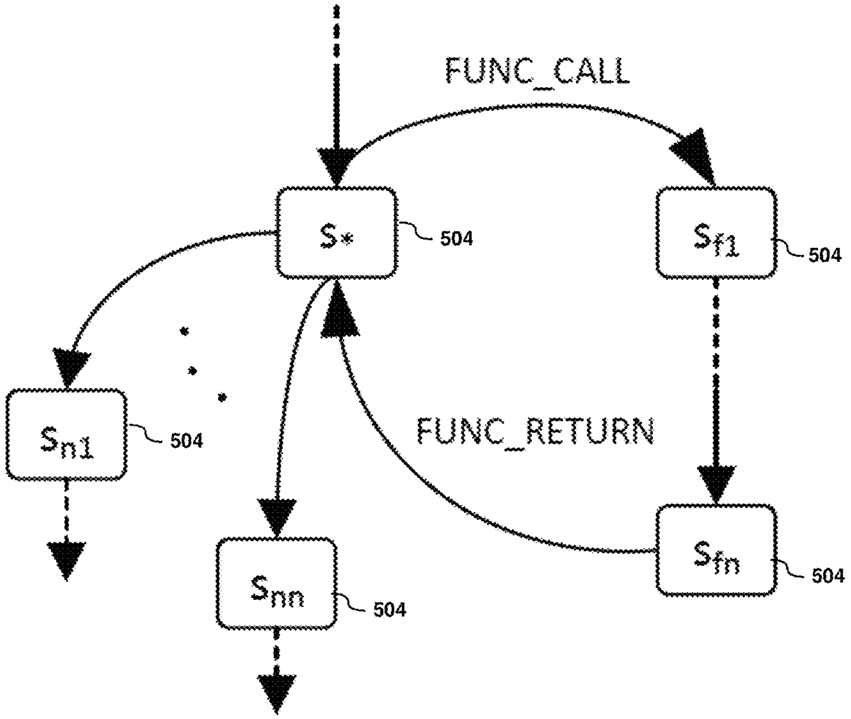
FIG. 16A illustrates an example of a graph showing how function calls may be modeled with the security automaton.
Figure 16B:
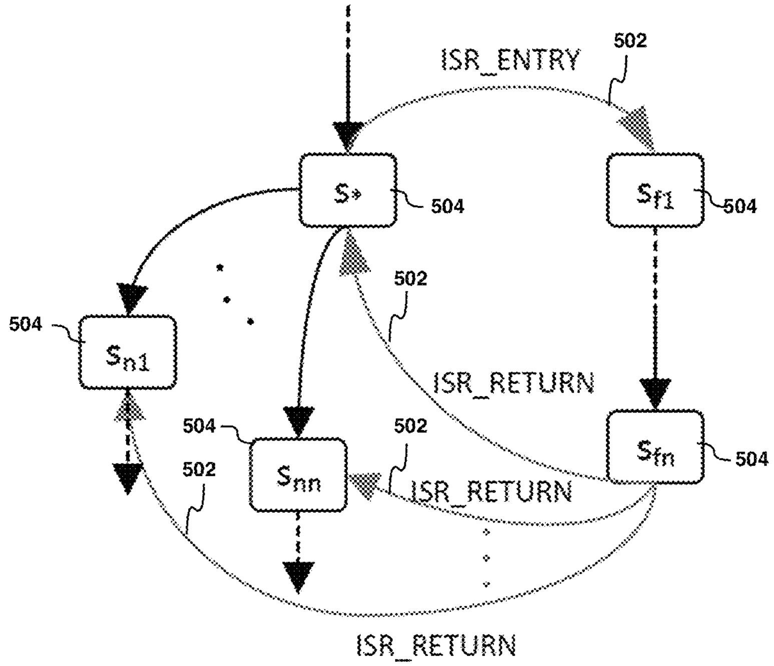
FIG. 16B illustrates an example of a graph showing ISRs may be modeled with the security automaton.

FIG. 16A and FIG. 16B illustrate an example of graphs showing how function calls and ISRs may be modeled with the security automaton. The graphs in FIGS. 16A and 16B represent a function call. The automaton states 504 $S_f$1 to $S_f n$ represent a sequence of control-flow transfers within the example ISR function. $S_*$ is the automaton state 504 where the function call occurs and returns. This model may be determined statically because the call location is available in the code. An interrupt, however, is unpredictable. Therefore, the occurrence of the interrupts and the corresponding return locations are determined at runtime. The model may represent this unpredictability with the transitions 502 in FIG. 16B labeled ISR_ENTRY and ISR_RETURN. Note that there are more than one possible return locations. There are multiple return locations in the illustrated example because an interrupt may occur at any given time during the execution of the code block 102 represented by $S_*$. If the interrupt occurs within the code block 102, the return location will be within it. However, suppose the interrupt occurs while the CPU executes the last instruction (the branch instruction 108 by definition) of the code block 102. In that case, the branch target(s) will be the return location(s) of the ISR, meaning there could be one or more return locations for the ISR. This may be modelled by creating transitions 502 from $S_f n$ to $S_*$ and all possible transition states 504 from $S_*$. As shown in FIG. 16B, the transition 502 to the ISR entry state may be labeled as ISR_ENTRY, and the transitions 502 representing the ISR returns may be labeled as ISR_RETURN. FIG. 17 shows the security policies 508 for the transitions 502 to and from the ISR.

At any automaton state 504 (denoted $s_*$), the security policy 508 shown in row 1 of the table in FIG. 17 requires the expected branch target to be the entry address of the given ISR for a valid transition to the ISR state. The associated action pushes all possible return states 504 (the interrupted state $s_*$ and its immediate neighbors $s_{n1}$, $s_{n2}, \ldots, s_{nn}$) onto the exception stack (es), which may be dedicated to tracking interrupt returns. The security policy 508 shown in row 2 of the table in FIG. 17 is a policy to ensure a valid ISR return. The security policy 508 requires retrieving all stored automaton states 504 from the exception stack (es) and verifying that the branch target belongs to the code block 102 of precisely one of them. The branch address must be a valid address within the code block 102 that the ISR originated from or the entry address of any of its neighboring code blocks 102.

When a higher-priority interrupt occurs while the current ISR is still executing, the automaton tracks such event by pushing the higher-priority ISR's return locations onto the exception. The exception thus enables support for nested interrupts.

Handling Context Switch

Figure 18:
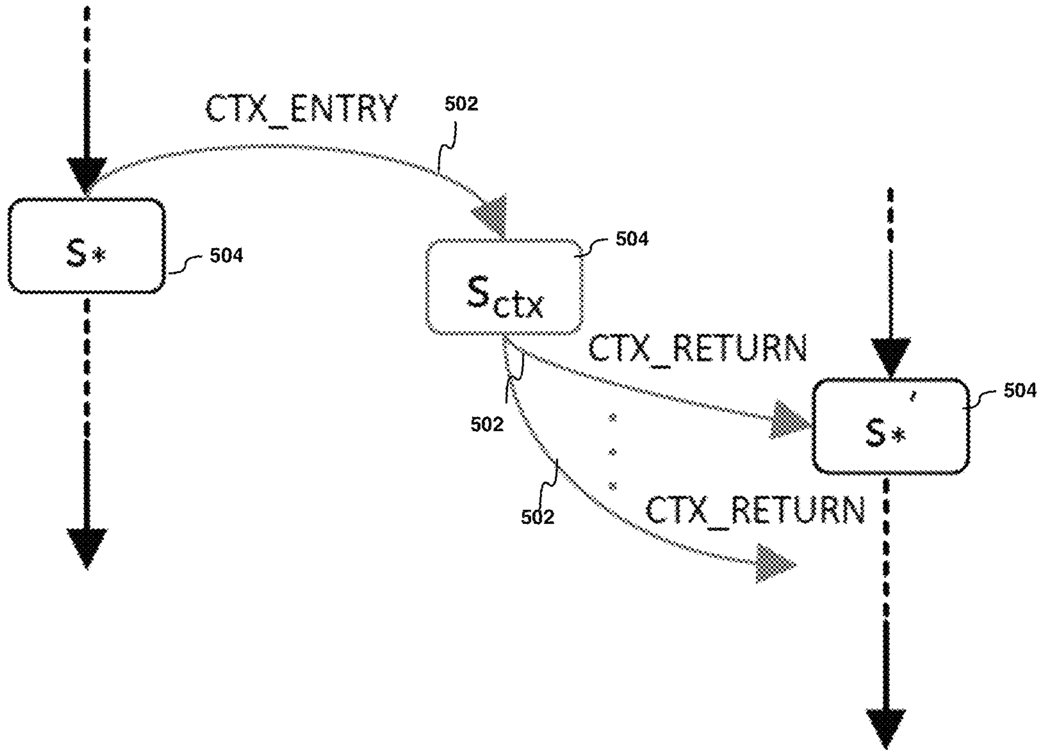
FIG. 18 illustrates an example of how a context switch may be modelled with the security automaton.

When an interrupt results in a context switch (because of a higher priority task becoming ready, the end of a time slice, or an external event), then the context of the incoming task is restored rather than that of the interrupted task. FIG. 18 illustrates an example of how a context switch may be modelled. Note that ISRs that perform context switching in RTOSes are usually compact to keep context switch overhead low. The context switch function acting as an ISR may be modelled with a single automaton state 504 $S_{ctx}$ as shown in FIG. 18. Suppose the automaton tracks a given task when a context switch interrupt occurs. Let $S_*$ represent the automaton state 504 at that instant, and S1 be the automaton state 504 representing where the incoming task resumes. The transition 502 from $S_*$ to $S_{ctx}$ represents a jump to the ISR, and the transitions 502 from $S_{ctx}$ to S1 and its immediate neighbors represent the return of the ISR to the incoming task. Because this is a particular ISR, we label these transitions 502 CTX_ENTRY and CTX_RETURN respectively to differentiate context switching ISR from a regular ISR. Similar to the RTOS, the automaton must save and restore task-specific context data (for example, the shadow stack and the forward stack) during a context switch. Therefore, the runtime stacks specified by the anomaly detection system 602 may be maintained per task. In addition, the automaton must know which task the RTOS scheduler selects during a context switch. This knowledge enables the anomaly detection system 602 to choose the appropriate runtime stacks corresponding to the incoming task. One way to obtain the ID of the selected task is by leveraging kernel-level hooks. For example, FreeRTOS provides traceTASK_SWITCHED_IN( ) macro that may be used to report the Task ID of the task selected by the FreeRTOS scheduler to run after switching context. The Task ID may then be embedded in the trace stream to communicate context switching to the runtime anomaly detector. The anomaly detection system 602 may use the Task ID to correctly select the appropriate runtime stacks to set the monitoring context.

FIG. 19 illustrates an example of the security policies 508 to model the target program's behavior during the transitions 502 of a context switch. Similar to the security policy 508 for a regular ISR, the security policy 508 shown in row 1 in FIG. 19 requires the transition 502 from any state $S_*$ to the context switch state $S_{ctx}$ when the CPU jumps to the entry address of the context switch ISR. The action required in this transition 502 is to save context data 514 (the interrupted automaton state 504 and all its immediate neighbors) in the context of the current task ID. When the CPU returns from the context switch ISR, the security policy 508 in row 2 in FIG. 19 requires the transition 502 from $S_{ctx}$ to the automaton state 504 determined by retrieving the saved context of the incoming task. Therefore, the action in this scenario is to determine the automaton state 504 representing where the incoming task resumes executing. The received branch target must then be verified to belong to the code block 102 the ISR originated from or the entry address of any of its neighboring code blocks 102.

Constructing appropriate security policies 508 for context switches may track additional real-time behaviors. For example, the sequence of job scheduling may be tracked by saving the history of Task IDs over a fixed time interval. The recorded sequence may then be verified with the scheduler's static scheduling policy to detect potential tampering with the scheduling algorithm.

Implementation

Figure 20:
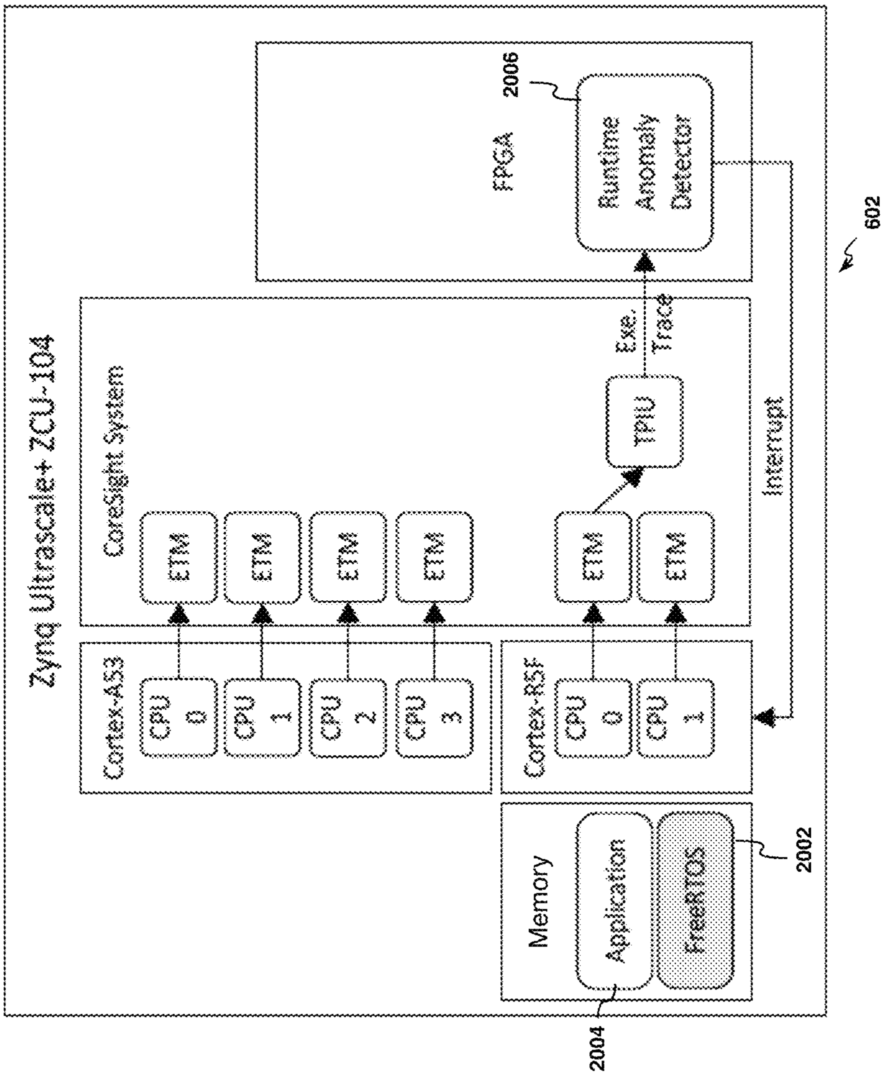
FIG. 20 illustrates an example of an anomaly detection system that is configured to handle ISRs and/or context switches.
Figure 21:
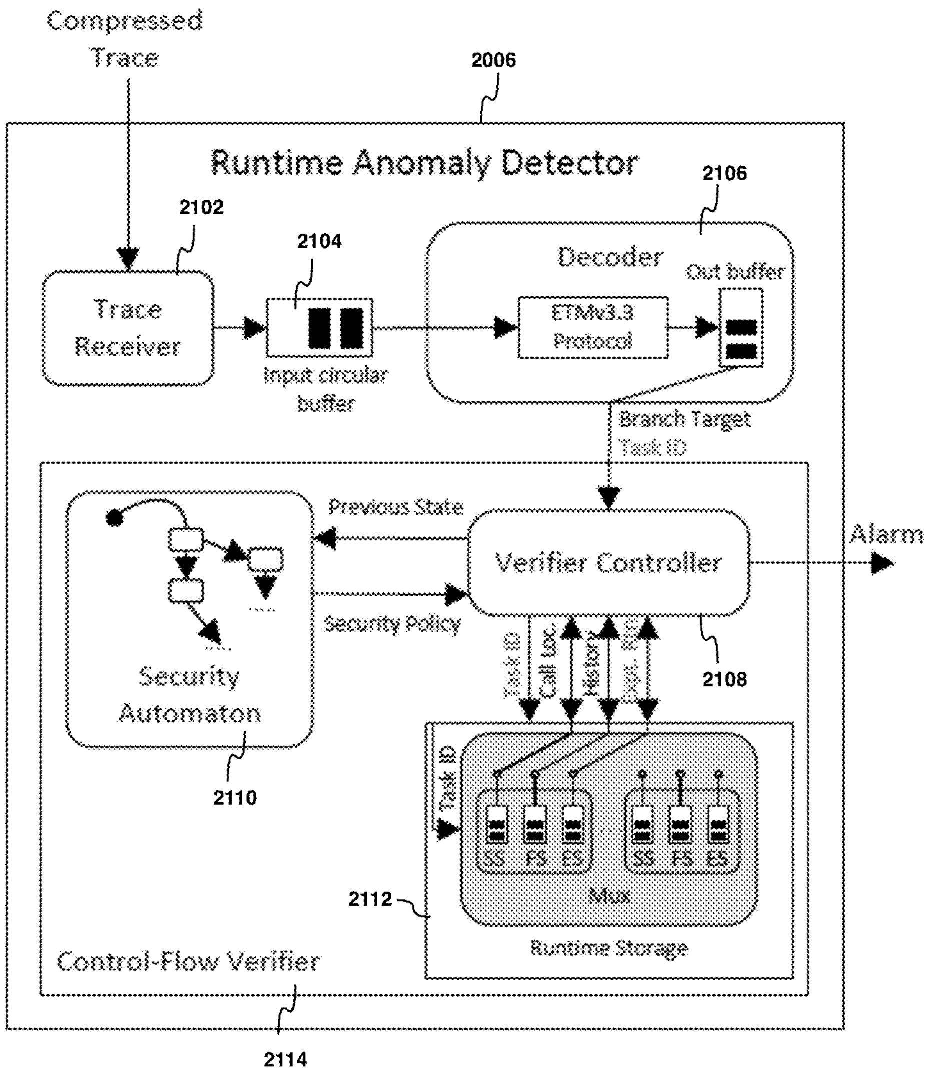
FIG. 21 illustrates details of the runtime anomaly detector shown in FIG. 20.
Figure 22:
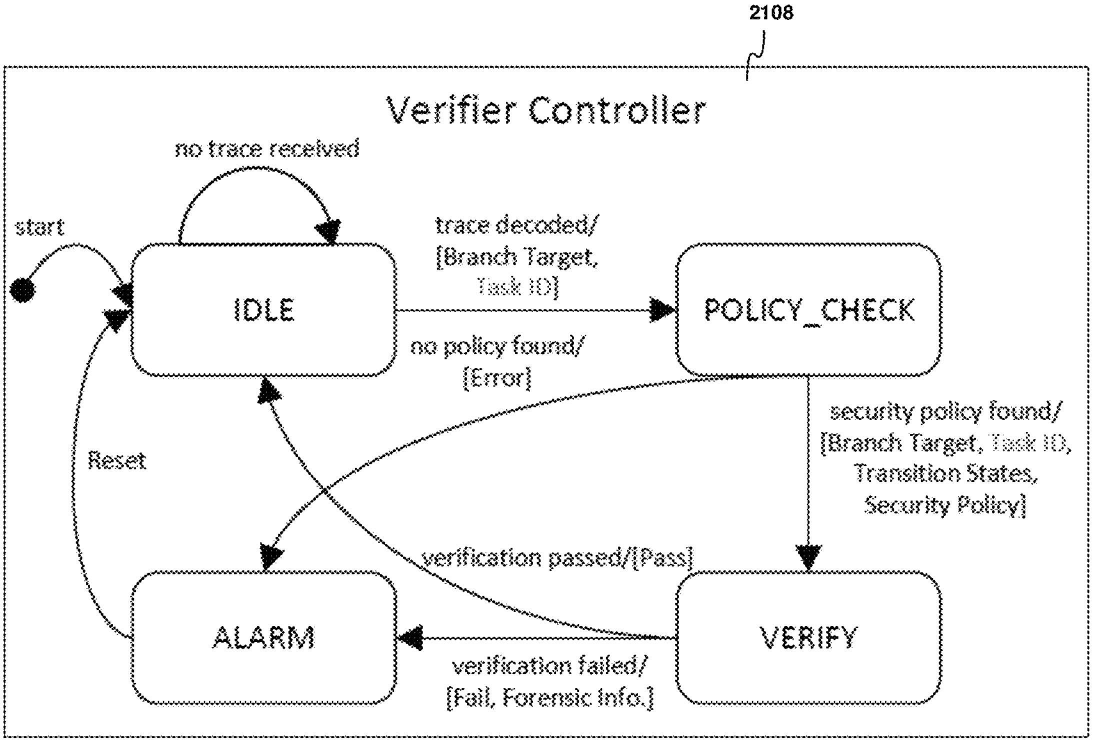
FIG. 22 illustrates an example implementation of the verifier controller.

An example implementation to handle ISRs and/or context switches may be similar to the examples described above in connection with FIGS. 12-15. The main difference includes additional FPGA modules implemented to facilitate interrupts and context switching. FIGS. 20-22 illustrate examples of components of the anomaly detection system 602 configured to handle ISRs and/or context switches.

FIG. 20 illustrates an example of the anomaly detection system 602 that is configured to handle ISRs and/or context switches. In the illustrated example, the software in the main memory now includes a real-time operating system 2002 in addition to a target program 2004 that is to be monitored. The RTOS 2002 has interrupt and/or context switching functionality. The target program 2004 may be a real-time program that runs in the RTOS 2002. In the illustrated example, the RTOS 2002 is FreeRTOS. A native FreeRTOS kernel hook traceTASK_SWITCHED_IN is implemented to communicate context switch information (Task ID) to the CoreSight system without modifying the FreeRTOS. The configuration of the CoreSight system remains essentially the same except for changes to the drivers to incorporate the hook to embed the Task ID of incoming tasks into the trace stream. A runtime anomaly detector 2006 in the FPGA uses the Task ID to manage the context of the automaton and track multiple tasks of the target program 2004. The FreeRTOS kernel, by default, uses FreeRTOS_IRQ_Handler as the central ISR to process all interrupts and manage context switching. The FreeRTOS kernel handles the system tick interrupt which is driven by a high precision hardware timer provided by the platform.

FIG. 21 illustrates details of the runtime anomaly detector 2006 shown in FIG. 20. Like the example shown in FIG. 14, the runtime anomaly detector 2006 includes a trace receiver 2102, an input FIFO circular buffer 2104, a decoder 2106, and a Control-Flow Verifier 2114. The Control-Flow Verifier (CFV) 2114 may include a verifier controller 2108, a security automaton 2110, and runtime storage 2112 like the CFV shown in FIG. 14. The security policies 508 are created as described above and may be included in the security automaton 2110 to track transitions 502 to and from the central ISR.

In contrast to the example shown in FIG. 14, maintaining the internal state of the security automaton 2110 requires runtime stacks per each monitored task in the runtime storage 2112. The number of concurrent tasks executed in the target program 2004 that may be supported by the security automaton 2110 may be fixed at compile time. The Python scripts to generate the VHDL code for the security automaton 2110 may be upgraded to incorporate support for interrupts and context switching as described above. The upgrade may include changes to generate VHDL code to create suitable structures in the runtime storage 2112 for the Shadow Stack (SS), Forward Stack (FS), and Exception Stack (ES) for each task. The Exception Stack may be runtime storage for interrupt-related data described above. Most of the custom FPGA logic may remain the same except for updates to the decoder 2106 to process Context ID trace packets to extract the Task ID and updates to the CFV logic to maintain the runtime stacks and storage to manage the context of the automaton properly.

Control-Flow Verifier 2114 for Real-Time Programs

The CFV 2114 for real-time programs may take an address of the jump location when the CPU executes the branch instruction 108 (Branch Target) as input. The CFV 2114 also may take a task ID value (Task ID) as input to identify the current task running on the CPU). The output of the CFV 2114 may be a signal (Alarm) that is an input of the Global Interrupt Controller (GIC) of the Cortex-R5F processor. This signal may be asserted when the CFV 2114 detects a control-flow violation. Modifications to the various components to support interrupts and/or context switching within the target program 2004 may be summarized below:

Verifier Controller 2108: The verifier controller 2108 shown in FIG. 22 verifies branch targets, manages the runtime storage 2112, and asserts an alarm when a control-flow violation is detected. The example of the verifier controller 2108 shown in FIG. 22 includes components that differ from the example shown in FIG. 15 only by additional logic and associated entities required to maintain runtime contextual data necessary for tracking control-flow transfers in multiple tasks. Modules (not shown) in the runtime storage 2112 may implement the runtime stacks (SS, FS, and ES) for each task. In some examples, standard modules, such as RTD storage modules, implement the runtime stacks. These stacks in the runtime storage 2112 may be multiplexed and selected based on the value of Task ID. At system reset, the verifier controller 2108 may enter the IDLE state. When a valid pair of branch targets and associated Task IDs are received by the verifier controller 2108, the verifier controller 2108 transitions from the IDLE state to a POLICY_CHECK state. In POLICY_CHECK, the verifier controller 2108 selects contextual storage entities (SS, FS, and ES) based on the value of Task ID. The previous security automaton state 504 (History) is retrieved from FS and used to request, from the security automaton 2110, corresponding security policies 508 and related information such as next automaton states 504 and actions. If the security policy 508 is found, the verifier controller 2108 enters a VERIFY state and checks all potential transition paths simultaneously. If a valid transition 502 is found, the necessary actions are applied, and the runtime storage 2112 is updated with the context data 514 accordingly. If no security policy 508 is found, which is an internal error because every security automaton state 504 should have a valid transition 502, the verifier controller 2108 enters an ALARM state and asserts the alarm signal. A possible source of an internal error is an incomplete CFG 902. A system reset may be cause the verifier controller 2108 to enter the IDLE state.

Security Automaton 2110: Referring again to FIG. 21, modifications to the security automaton 2110 to support interrupts and context switching are incorporated using the input file used in the automaton generation algorithm. Interrupts and context switch policies may be defined in the XML file statically because all ISRs are typically statically defined for real-time systems. The generated VHDL LUT code automatically contains entries similar to the transitions 502 shown in FIG. 17 and FIG. 19.

Runtime Storage 2112: As explained above, supporting interrupts and context switching relies on additional entities in the runtime storage 2112 to support interrupt and context switch-related policy actions. For example, in addition to the Shadow Stack and Forward Stack, a third stack, called Exception Stack, is used to track ISR return automaton states 504. The verifier controller 2108 maintains the three stacks for each monitored task. The return states 504 are determined at runtime when an interrupt is detected and pushed onto the Exception Stack for use by the verifier controller 2108 when validating interrupt returns. Note that this information is determined at runtime because interrupts are raised at unpredictable times. The verifier controller 2108 uses the value of Task ID to select which set of the multiplexed stacks to manage at runtime.

The workflow for static analysis of the target program, integration, and testing on the target platform remains unchanged. A few further examples systems, devices, and methods are provided below.

The runtime anomaly detector 2006 may include the controller 2108 and the security automaton 2110. The controller 2108 may be configured to receive a branch target, where the branch target corresponds a memory location pointed to by a program counter of a processor in response to an interrupt, a context switch, or an execution of a branch instruction 108 during execution of the target program 2004 by the processor. The security automaton 2110 may be configured to implement an extended finite state machine (EFSM), the EFSM comprising the states 504 and transitions 502, the transitions 502 representing valid transitions 502 between the states 504. The states 504 may correspond to code blocks 102 in the control-flow graph 902 for the target program 2004, and the transitions 502 may correspond to edges 904 in the control-flow graph 902. Each of the code blocks 102 in the control-flow graph 902 may represent a respective sequence of assembly code instructions in the target program 2004 that begins on a function entry 104 or a next sequential instruction after a prior branch instruction 108 and ends on a closing branch instruction 108. For each respective one of the code blocks 102, one or more of the edges 904 is from the respective one of the code blocks 102 to each target code block of all branch targets of the respective one of code blocks 102. Each of the transitions 502 has one or more security policies 508 based on a label 506 assigned to a corresponding one of the edges 904, the label 506 indicating a branch type of the corresponding one of the edges 904. The controller 2108 may be configured to enforce the one or more security policies 508 of a respective one of the transitions 502 that corresponds to a current transition 502 from a previous state to a next state, the next state corresponding to the branch target. The controller 2108 may be further configured to raise an alarm in response to the current transition 502 being invalid according to the one or more security policies 508 of the respective one of the transitions 502.

In some examples, the runtime anomaly detector 2006 is configured to receive the branch target from execution trace hardware or from a system bus of the processor.

In some examples, the runtime anomaly detector 2006 further comprises the runtime storage 2112. The runtime storage 2112 may include a shadow stack, where the security policies 508 of the transitions 502 corresponding to the edges 904 having the branch type of a function call include a first update function 512 configured to push a call location onto the shadow stack, and where the security policies 508 of the transitions 502 corresponding to the edges 904 having the branch type of a function return include a second update function 512 configured to pop the call location from the shadow stack and a guard function 510 to verify the call location. Alternatively or in addition, the runtime storage 2112 may include an exception stack, where the security policies 508 of the transitions 502 corresponding to the edges 904 having the branch type of an ISR entry include a first update function 512 configured to push an ISR return location onto the exception stack, and where the security policies 508 of the transitions 502 corresponding to the edges 904 having the branch type of an ISR return include a second update function 512 configured to pop the ISR return location from the exception stack and a guard function 510 configured to verify the ISR return location. Alternatively or in addition, the runtime storage 2112 may include an exception stack per task id, where the security policies 508 of the transitions 502 corresponding to the edges 904 having the branch type of a CTX entry include a first update function 512 configured to push a CTX return location onto the exception stack for a current task, and where the security policies 508 of the transitions 502 corresponding to the edges 904 having the branch type of a CTX return include a second update function 512 configured to pop the CTX return location from the exception stack for the current task and a guard function 510 configured to verify the CTX return location.

In some examples, the security policies 508 for one or more of the transitions 502 includes a guard function 510 configured to confirm that a difference between an execution time of a function detected at runtime and an expected execution time of the function is within an acceptable margin of error. The expected execution time of the function may be included in context data 514 of the transition 502 corresponding to an edge 904 having the branch type of a function return for the function.

Figure 23:
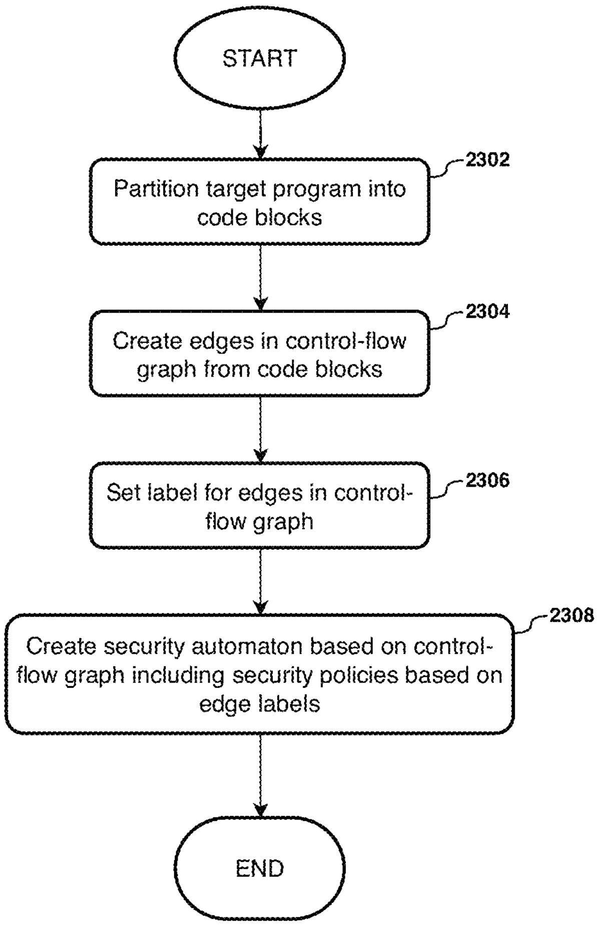
FIG. 23 illustrates a flow diagram of example operations to generate the security automaton.

FIG. 23 illustrates a flow diagram of example operations to generate the security automaton 2110 for detecting anomalous software behavior in the target program 2004. The operations may include additional, different, or fewer operations than illustrated. The steps may be executed in a different order than illustrated. 8.

Assembly code 302 of the target program 2004 may be partitioned (2302) into the code blocks 102, where each respective one of the code blocks 102 represents a sequence of instructions that begins on a function entry 104 or a next sequential instruction after a prior branch instruction 108 and ends on a closing branch instruction 108.

Edges 904 may be created (2304) in the control-flow graph 902 by creating, for each respective one of the code blocks 102, a corresponding edge 904 between a respective initial code block, which is the respective one of the code blocks 102, and each respective target code block of all branch targets of the respective initial code block, where the control-flow graph 902 is a memory structure in a computer readable memory.

A label 506 may be set (2306) for each respective one of the edges 904 in the control-flow graph 902 indicative of a branch type of the respective one of the edges 904. The label 506 for each respective one of the edges 904 may indicate a type of the closing branch instruction 108 in the respective initial code block of the corresponding one of the edges 904, a type of the respective initial code block of the corresponding one of the edges 904 and/or a type of a respective ending code block of the corresponding one of the edges 904.

The security automaton 2110 may be created (2308) in the computer readable memory based on the control-flow graph 902. Creating the security automaton 2110 may include: creating transitions 502, each of the transitions 502 representing a valid transition 502 between two respective ones of states 504, the transitions 502 corresponding to the edges 904 in the control-flow graph 902, the states 504 corresponding to the code blocks 102 in the control-flow graph 902, and setting one or more of security policies 508 on the transitions 502 based on the label 506 for the edges 904 corresponding to the transitions 502.

Operations may terminate by, for example, generating source code for the security automaton 2110 in the computer readable memory based on the transitions 502.

In some examples, user-defined edges 904 may be added to the edges 904 of the control-flow graph 902. In some examples, the user-defined edges 904 may be obtained from a dynamic analysis of the assembly code 302 of the target program 2004 and/or from one or more security requirements.

In some examples, the label 506 may be set for each respective one of the edges 904 in which a respective ending code block is an interrupt subroutine entry, the respective initial code block is a last code block of the interrupt subroutine, the respective ending code block is an entry of a context switch routine, or the respective initial code block is an ending code block of the context switch routine, to indicate the branch type is an ISR entry, an ISR return, a CTX entry, or a CTX return, respectively.

In some examples, context data 514, for each respective one of the edges 904 in which the respective ending block is a function return location, may be set to a memory location of a function call in the respective ending block that calls the respective initial code block.

In some examples, for each respective one of the code blocks 102 having indirect branch targets that are unavailable from a static analysis of the assembly code 302, a corresponding edge 904 between the respective initial code block and a virtual code block may be created in the control-flow graph 902, and the corresponding edge 904 labeled as unknown. The indirect branch targets of the edges 904 labeled as unknown may be resolved by executing the target program 2004 and monitoring the target program 2004 with the security automaton 2110. The virtual code block may be replaced the code block 102 resolved during the monitoring process.

In some examples, timing data may be included by executing the target program 2004; monitoring the target program 2004 with the security automaton 2110; and including the timing data as context data 514 in the transitions 502.

A non-transitory computer readable storage medium may be provided comprising computer executable instructions, the computer executable instructions executable by a processor, the computer executable instructions comprising: instructions executable to partition assembly code of a target program 2004 into code blocks 102, where each respective one of the code blocks 102 represents a sequence of instructions that begins on a function entry 104 or a next sequential instruction after a prior branch instruction 108 and ends on a closing branch instruction 108; instructions executable to create edges 904 in a control-flow graph 902 by creating, for each respective one of the code blocks 102, a corresponding edge 904 between a respective initial code block, which is the respective one of the code blocks 102, and each respective target code block of all branch targets of the respective initial code block, the control-flow graph 902 being a memory structure in a computer readable memory; instructions executable to set a label 506 for each respective one of the edges 904 in the control-flow graph 902 indicative of a branch type of the respective one of the edges 904; and instructions executable to create a security automaton 2110 in the computer readable memory based on the control-flow graph 902, where the instructions executable to create the security automaton 2110 include: instructions executable to create transitions 502, each of the transitions 502 representing a valid transition 502 between two respective ones of states 504, the transitions 502 corresponding to the edges 904 in the control-flow graph 902, the states 504 corresponding to the code blocks 102 in the control-flow graph 902, and instructions executable to set one or more of security policies 508 on the transitions 502 based on the label 506 for the edges 904 corresponding to the transitions 502.

The instructions executable to create the security automaton 2110 may further include instructions executable to generate source code for the security automaton 2110 in the computer readable memory from the transitions 502. In some examples, the source code for the security automaton 2110 is in a hardware descriptive language.

The non-transitory computer readable storage medium may further comprise instructions executable to set the label 506 for each respective one of the edges 904 in which a respective ending code block is an interrupt subroutine entry, the respective initial code block is a last code block of the interrupt subroutine, the respective ending code block is an entry of a context switch routine, or the respective initial code block is an ending code block of the context switch routine, to indicate the branch type is an ISR entry, an ISR return, a CTX entry, or a CTX return, respectively.

Each component may include additional, different, or fewer components than illustrated. For example, the anomaly detection system 602 may be implemented with additional, different, or fewer components. For example, the anomaly detection system 602 may include only the runtime anomaly detector 2006. Alternatively, or in addition, runtime anomaly detector 2006 may be implemented with additional, different, or fewer components. For example, the runtime anomaly detector 2006 may include only the verifier controller 2108 and the security automaton 2110. The logic illustrated in the pseudo code shown in FIGS. 2 and 4 may include additional, different, or fewer operations than illustrated. The operations illustrated may be performed in an order different than illustrated.

Referring to FIG. 6, the processor may be in communication with the memory. Examples of the processor may include a general processor, a central processing unit, a microcontroller, an application specific integrated circuit (ASIC), a digital signal processor, a field programmable gate array (FPGA), and/or a digital circuit. Referring to FIGS. 14, 21, and 22, the verifier controller 2108 may include a general processor, a central processing unit, a microcontroller, an application specific integrated circuit (ASIC), a digital signal processor, a field programmable gate array (FPGA), and/or a digital circuit.

The processor and the verifier controller 2108 may be any devices operable to execute logic. The logic may include computer executable instructions or computer code embodied in the memory or in other memory that when executed by the processor or the verifier controller 2108, cause the processor or the verifier controller 2108 to perform the features implemented by the logic. The computer code may include instructions executable with the processor or the verifier controller 2108.

The anomaly detection system 602 and/or the runtime anomaly detector 2006 may be implemented in many different ways. Each module, such as the verifier controller 2108, the security automaton 2110, the trace receiver 2102, and the input FIFO circular buffer 2104, may be hardware or a combination of hardware and software. For example, each module may be implemented in an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a computer readable storage medium, that comprises instructions executable with a processor to implement one or more of the features of the module. When any one of the modules includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the anomaly detection system 602 and/or the runtime anomaly detector 2006 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the FIGURES or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A runtime anomaly detector comprising:

a controller configured to receive a branch target, wherein the branch target corresponds a memory location pointed to by a program counter of a processor in response to an interrupt, a context switch, or an execution of a branch instruction during execution of a target program by the processor; and a security automaton configured to implement an extended finite state machine (EFSM), the EFSM comprising a plurality of states and a plurality of transitions, the transitions representing valid transitions between the states, wherein the states correspond to a plurality of code blocks in a control-flow graph for the target program, and the transitions correspond to a plurality of edges in the control-flow graph, wherein each of the code blocks in the control-flow graph represents a respective sequence of assembly code instructions in the target program that begins on a function entry or a next sequential instruction after a prior branch instruction and ends on a closing branch instruction, wherein for each respective one of the code blocks, one or more of the edges is from the respective one of the code blocks to each target code block of all branch targets of the respective one of code blocks, and wherein each of the transitions has one or more of a plurality of security policies based on a label assigned to a corresponding one of the edges, the label indicating a branch type of the corresponding one of the edges, and wherein the controller is configured to enforce the one or more of the security policies of a respective one of the transitions that corresponds to a current transition from a previous state to a next state, the next state corresponding to the branch target, and wherein the controller is configured to raise an alarm in response to the current transition being invalid according to the one or more of the security policies of the respective one of the transitions.

2. The runtime anomaly detector of claim 1, wherein the runtime anomaly detector is configured to receive the branch target from execution trace hardware or from a system bus of the processor.

3. The runtime anomaly detector of claim 1 further comprising a runtime storage which includes a shadow stack, wherein the security policies of the transitions corresponding to the edges having the branch type of a function call include a first update function configured to push a call location onto the shadow stack, and wherein the security policies of the transitions corresponding to the edges having the branch type of a function return include a second update function configured to pop the call location from the shadow stack and a guard function to verify the call location.

4. The runtime anomaly detector of claim 1 further comprising a runtime storage which includes an exception stack, wherein the security policies of the transitions corresponding to the edges having the branch type of an ISR entry include a first update function configured to push an ISR return location onto the exception stack, and wherein the security policies of the transitions corresponding to the edges having the branch type of an ISR return include a second update function configured to pop the ISR return location from the exception stack and a guard function configured to verify the ISR return location.

5. The runtime anomaly detector of claim 1 further comprising a runtime storage which includes an exception stack per task id, wherein the security policies of the transitions corresponding to the edges having the branch type of a CTX entry include a first update function configured to push a CTX return location onto the exception stack for a current task, and wherein the security policies of the transitions corresponding to the edges having the branch type of a CTX return include a second update function configured to pop the CTX return location from the exception stack for the current task and a guard function configured to verify the CTX return location.

6. The runtime anomaly detector of claim 1, wherein the security policies for one or more of the transitions includes a guard function configured to confirm that a difference between an execution time of a function detected at runtime and an expected execution time of the function is within an acceptable margin of error.

7. The runtime anomaly detector of claim 6, wherein the expected execution time of the function is included in context data of a transition corresponding to an edge having the branch type of a function return for the function.

8. A computer-implemented method to generate a security automaton for detecting anomalous software behavior, the method comprising:

partitioning assembly code of a target program into a plurality of code blocks, wherein each respective one of the code blocks represents a sequence of instructions that begins on a function entry or a next sequential instruction after a prior branch instruction and ends on a closing branch instruction;

creating a plurality of edges in a control-flow graph by creating, for each respective one of the code blocks, a corresponding edge between a respective initial code block, which is the respective one of the code blocks, and each respective target code block of all branch targets of the respective initial code block, wherein the control-flow graph is a memory structure in a computer readable memory;

setting a label for each respective one of the edges in the control-flow graph indicative of a branch type of the respective one of the edges; and creating the security automaton in the computer readable memory based on the control-flow graph, wherein creating the security automaton includes:

creating a plurality of transitions, each of the transitions representing a valid transition between two respective ones of a plurality of states, the transitions corresponding to the edges in the control-flow graph, the states corresponding to the code blocks in the control-flow graph, and setting one or more of a plurality of security policies on the transitions based on the label for the edges corresponding to the transitions.

9. The method of claim 8 further comprising adding a plurality of user-defined edges to the edges of the control-flow graph.

10. The method of claim 9 further comprising obtaining the user-defined edges from a dynamic analysis of the assembly code of the target program and/or from one or more security requirements.

11. The method of claim 8, wherein the label for each respective one of the edges indicates a type of the closing branch instruction in the respective initial code block of the corresponding one of the edges, a type of the respective initial code block of the corresponding one of the edges and/or a type of a respective ending code block of the corresponding one of the edges.

12. The method of claim 8 further comprising setting the label for each respective one of the edges in which a respective ending code block is an interrupt subroutine entry, the respective initial code block is a last code block of the interrupt subroutine, the respective ending code block is an entry of a context switch routine, or the respective initial code block is an ending code block of the context switch routine, to indicate the branch type is an ISR entry, an ISR return, a CTX entry, or a CTX return, respectively.

13. The method of claim 8 further comprising setting, for each respective one of the edges in which the respective ending block is a function return location, context data to a memory location of a function call in the respective ending block that calls the respective initial code block.

14. The method of claim 8 further comprising creating in the control-flow graph, for each respective one of the code blocks having indirect branch targets that are unavailable from a static analysis of the assembly code, a corresponding edge between the respective initial code block and a virtual code block, the corresponding edge labeled as unknown.

15. The method of claim 14 further comprising resolving the indirect branch targets of the edges labeled as unknown by executing the target program and monitoring the target program with the security automaton.

16. The method of claim 8 further comprising: collecting timing data by executing the target program; monitoring the target program with the security automaton; and including the timing data as context data in the transitions.

17. A non-transitory computer readable storage medium comprising a plurality of computer executable instructions, the computer executable instructions executable by a processor, the computer executable instructions comprising:

instructions executable to partition assembly code of a target program into a plurality of code blocks, wherein each respective one of the code blocks represents a sequence of instructions that begins on a function entry or a next sequential instruction after a prior branch instruction and ends on a closing branch instruction;

instructions executable to create a plurality of edges in a control-flow graph by creating, for each respective one of the code blocks, a corresponding edge between a respective initial code block, which is the respective one of the code blocks, and each respective target code block of all branch targets of the respective initial code block, the control-flow graph being a memory structure in a computer readable memory;

instructions executable to set a label for each respective one of the edges in the control-flow graph indicative of a branch type of the respective one of the edges; and instructions executable to create a security automaton in the computer readable memory based on the control-flow graph, wherein the instructions executable to create the security automaton include:

instructions executable to create a plurality of transitions, each of the transitions representing a valid transition between two respective ones of a plurality of states, the transitions corresponding to the edges in the control-flow graph, the states corresponding to the code blocks in the control-flow graph, and instructions executable to set one or more of a plurality of security policies on the transitions based on the label for the edges corresponding to the transitions.

18. The non-transitory computer readable storage medium of claim 17, wherein the instructions executable to create the security automaton further include instructions executable to generate source code for the security automaton in the computer readable memory from the transitions.

19. The non-transitory computer readable storage medium of claim 18, wherein the source code for the security automaton is in a hardware descriptive language.

20. The non-transitory computer readable storage medium of claim 17 further comprising instructions executable to set the label for each respective one of the edges in which a respective ending code block is an interrupt subroutine entry, the respective initial code block is a last code block of the interrupt subroutine, the respective ending code block is an entry of a context switch routine, or the respective initial code block is an ending code block of the context switch routine, to indicate the branch type is an ISR entry, an ISR return, a CTX entry, or a CTX return, respectively.

* * * * *